GLASSWARE FORMING MACHINE

Filed Sept. 20, 1954

Inventor
Harold A. Youkers
by Bair, Freeman & Molinare
Attys.

Inventor
Harold A. Youkers
by Bair, Freeman & Molinare
Attys.

Feb. 24, 1959 H. A. YOUKERS 2,874,516

GLASSWARE FORMING MACHINE

Filed Sept. 20, 1954 25 Sheets-Sheet 3

Inventor
Harold A. Youkers
by Bair, Freeman & Molinare
Attys.

Inventor
Harold A. Youkers
by Bair, Freeman & Molinare
Attys.

GLASSWARE FORMING MACHINE

Filed Sept. 20, 1954 25 Sheets-Sheet 5

Inventor
Harold A. Youkers
by Bair, Freeman & Molinare
Attys.

Feb. 24, 1959 H. A. YOUKERS 2,874,516

GLASSWARE FORMING MACHINE

Filed Sept. 20, 1954 25 Sheets-Sheet 6

Inventor
Harold A. Youkers
by Bair, Freeman & Molinare
Att'ys.

Feb. 24, 1959 H. A. YOUKERS 2,874,516

GLASSWARE FORMING MACHINE

Filed Sept. 20, 1954 25 Sheets-Sheet 7

Inventor
Harold A. Youkers
by Bair, Freeman & Molinare
Attys.

Inventor
Harold A. Youkers
By Bair, Freeman & Molinare
Attys.

Feb. 24, 1959 H. A. YOUKERS 2,874,516

GLASSWARE FORMING MACHINE

Filed Sept. 20, 1954 25 Sheets-Sheet 9

Inventor
Harold A. Youkers
By Bair, Freeman & Molinare
Attys.

Feb. 24, 1959 H. A. YOUKERS 2,874,516

GLASSWARE FORMING MACHINE

Filed Sept. 20, 1954 25 Sheets-Sheet 10

Inventor
Harold A. Youkers
by Bair, Freeman & Molinare
Attys.

Inventor
Harold A. Youkers
by Bair, Freeman & Molinare
Attys.

Inventor
Harold A. Youkers
by Bair, Freeman & Molinare
Attys.

Inventor
Harold A. Youkers
by Bair, Freeman & Molinare
Attys.

Feb. 24, 1959 H. A. YOUKERS 2,874,516
GLASSWARE FORMING MACHINE
Filed Sept. 20, 1954 25 Sheets-Sheet 13

Inventor
Attys.

Inventor-Harold A. Youkers by Bair, Freeman & Molinare Attys.

Feb. 24, 1959 H. A. YOUKERS 2,874,516

GLASSWARE FORMING MACHINE

Filed Sept. 20, 1954 25 Sheets-Sheet 15

Inventor
Harold A. Youkers
by Bair, Freeman & Molinare
Attys.

Feb. 24, 1959 H. A. YOUKERS 2,874,516

GLASSWARE FORMING MACHINE

Filed Sept. 20, 1954 25 Sheets-Sheet 16

Inventor
Harold A. Youkers
by Bair, Freeman & Molinare
Attys.

Feb. 24, 1959 H. A. YOUKERS 2,874,516

GLASSWARE FORMING MACHINE

Filed Sept. 20, 1954 25 Sheets-Sheet 17

Inventor
Harold A. Youkers
by Bair, Freeman & Molinare
Attys.

Inventor
Harold A. Youkers
by Bair, Freeman & Molinare
Attys.

Feb. 24, 1959 H. A. YOUKERS 2,874,516

GLASSWARE FORMING MACHINE

Filed Sept. 20, 1954 25 Sheets-Sheet 19

Inventor
Harold A. Youkers
by Bair, Freeman & Molinare
Attys.

Inventor
Harold A. Youkers
by Bair, Freeman & Molinare
Attys.

Inventor
Harold A. Youkers
by Bair, Freeman & Molinare
Attys.

Feb. 24, 1959 H. A. YOUKERS 2,874,516

GLASSWARE FORMING MACHINE

Filed Sept. 20, 1954 25 Sheets-Sheet 22

Inventor
Harold A. Youkers
by Bair, Freeman & Molinare
Attys.

Feb. 24, 1959 H. A. YOUKERS 2,874,516

GLASSWARE FORMING MACHINE

Filed Sept. 20, 1954 25 Sheets-Sheet 23

Inventor
Harold A. Youkers
by Bair, Freeman & Molinare
Attys.

Feb. 24, 1959 H. A. YOUKERS 2,874,516

GLASSWARE FORMING MACHINE

Filed Sept. 20, 1954 25 Sheets-Sheet 24

Inventor
Harold A. Youkers
by Bair, Freeman & Molinare
Attys.

GLASSWARE FORMING MACHINE

Filed Sept. 20, 1954

Inventor-Harold A. Youkers Bair, Freeman & Molinare Attys.

United States Patent Office 2,874,516
Patented Feb. 24, 1959

2,874,516

GLASSWARE FORMING MACHINE

Harold Alfred Youkers, Oil City, Pa., assignor to Lynch Corporation, Anderson, Ind., a corporation of Indiana Application September 20, 1954, Serial No. 456,981

21 Claims. (Cl. 49—9)

This invention relates to a machine for forming glassware and to a method of forming glassware wherein parisons are formed in parison molds, then transferred to blow molds wherein they are blown to the final shape, and thereafter transferred to a cooling station where they are suspended for a period of time over a conveyor wind box and permitted to cool before being deposited on a conveyor for transport to the annealing lehr, all while held in the same finish ring.

Heretofore, there have been two generally accepted processes for producing glassware by the "counterblow" or "blow-and-blow" method, and the machine designs have been influenced by the methods of transfer. The two most common transfer methods are: (1) the inversion of the parison by its neck ring after it has been counterblown, then blowing to final shape in the blow mold; and (2) the inversion of the ware while in the parison mold and subsequent transfer to the blow mold. This latter method has some very real advantages in enabling the delivery of a more perfect parison to the blow mold. It entails, however, two separate operations for inversion and transfer. This limitation has resulted in the almost exclusive use of the second method for intermittent two-table machines.

A machine of the kind under (1) above is a "stationary unit" machine (wherein several of the units may be arranged to receive glass from one feeder) as distinguished from intermittent or continuous motion machines that can be classed under (2) above. The advantages of a stationary unit machine over intermittent or continuous motion machines are many: (1) the ability to repair, adjust or fit one of the units with alternate mold equipment while maintaining the remaining units in production and (2) the higher mold rate available per unit (whereas to stop and start the heavier machine [or tables] in intermittent machines and the difficulty of servicing mold equipment on continuous motion machines operating at above 10 per minute mold rate do not permit as high a rate). There is another important factor in that much greater flexibility of cycle is available on a stationary unit machine, i. e., the time cycle can be readily revised to more adequately fit it to the requirements of the particular item to be manufactured.

In the glassware forming art it is well established that a machine designed to provide means for final blowing of the parison to blow mold shape through the finish ring is highly desirable for the following reasons: (1) it eliminates bulged and distorted finishes (2) it provides positive registration of parison in blow mold and (3) by eliminating the air used in conventional machines to equalize pressure on the finish (at the neck) there is no leakage of equalizing air into the mold cavity. This leakage air outside of the parison prevents the bottle from blowing solidly. When this leakage into the mold cavity is present it is very difficult to get letters and decorations blown sharply, and out-of-roundness is usually prevalent.

One object of my present invention is to provide a glassware forming machine wherein all these desirable characteristics are obtained while providing a machine capable of maximum use of both parison forming and final blowing facilities. Accordingly, I have provided three neck ring mechanisms mounted on a turret which are advanced in sequence through parison forming operation, final blowing and then to the take out conveyor where the finished bottle is suspended for a period of time over the conveyor wind box and permitted to cool before being deposited on the conveyor for transport to the secondary conveyor and thence to the lehr. Each neck ring, in turn, is engaged with the blank mold and is caused to rotate in a vertical plane with the blank into an inverted position in which position the plunger mechanism engages the finish ring and, on receiving a gob of glass, forms the finish. After a suitable mechanism closes the blank cavity with a baffle, the parison is inflated. When the parison has assumed a suitable stiffness and gives up a proper amount of heat, the blank mold is reverted and opened and the parison is ready for transfer to the blow mold. By this method less freezing of the parison is required than in a design where the parison is inverted outside the blank mold. This lessened requirement will permit a more perfectly reheated parison to be delivered to the blow mold. Thus, a greater proportion of total time at the blow mold station can be utilized than on existing machines.

The advantages of my arrangement are that I have maintained the desirable feature of inversion in the parison mold but, through the use of three finish rings, one movement advances the parison to blow mold and moves another finish ring into position for immediate beginning of another parison forming cycle. The third finish ring delivers the finished bottle to the conveyor. This overlap of cycle is the determining factor in machine speeds in that the shorter the time from delivery of parison until parison mold can be reloaded with a new charge determines the number of parisons that can be produced by my machine. The same reasoning applies to the maximum time that glass can be kept in the blow mold. As will be readily seen from the operations diagram of my patent drawings, the parison and blow molds can be opened and closed in unison. This setting will provide a greater total use of timing.

Another object of my invention is to secure the advantage of engaging the parison carrying finish ring with the blow mold during the final blow period. There is considerable advantage in holding the blown bottle in the finish ring during the blow mold opening movement. The usually troublesome difficulty experienced in conventional machines of the bottle falling to one or the other mold half and dragging with it is eliminated. The remedy for this fault is usually excessive swabbing which leads to dirty equipment and poor quality ware.

Another advantage gained through blowing through the finish ring is in the making of ware without hang-up beads (usually known as "thread hang-up" jobs) which won't hang straight. These are virtually impossible of successful production on conventional counterblow machines but will present no difficulty in my design. The readily commercial production of such items will permit the making of cosmetic type ware, eliminating the necessity for concealed bead finishes, and will provide greater utility of glass containers through improved shapes, particularly shoulder contours. My method eliminates the requirement for a bead to hang the parison in the mold for final blowing. A great deal of cosmetic ware is of this construction and can be made with no more difficulty in my machine than other types of ware.

Still another advantage is the entire elimination of the conventional take-out device which is generally conceded to comprise a large share of the total machine troubles experienced in conventional machines.

The foregoing advantages of my "stationary unit" machine make it possible to arrange six of the units to operate as one "machine," with each unit complete unto itself so that one unit may be removed and replaced with an identical unit for maintenance while the remaining five units continue in operation. This should make for an overall higher mechanical efficiency and eliminate the necessity for having maintenance men on all shifts throughout a 24-hour day for repair of the machines.

Individual timer controlled units are provided making the six-unit machine completely flexible as to sequence and duration of any operation, thus making the machine efficient for producing a wide variety of shapes and sizes of bottles. For large ware at slower speeds, units with the flexibility of timing that I provide can be set up wherein blank and blow molds are given large proportions of the total time to set up the glass (solid enough to be removed from the machine). However, on small items at high speed the machine can be adjusted to use major portions of the cycle in machine movements and relatively shorter periods are then provided for forming the glass. This flexibility provides much higher speeds in both categories than are possible in fixed cycle machines.

A further object is to provide a machine designed for hydraulic operation and this medium permits the use of much improved locking means on parison and blow molds.

Tighter locking (hydraulic piston and toggle as against pneumatic piston and toggle) can materially reduce mold maintenance costs through reduction of glass joint penetration. Hydraulic fluid operation coupled with cammed valving provides much improved stability of operation over air operated units.

Regarding mold inter-relation fits with my machine, I have provided means for allowing the heavier blank and blow molds to pull the engaging parts into position without stress (finish ring in holder can move vertically, horizontally and radially). This eliminates the extreme requirements on mold blank and the binding of mold fits found on machines where both machine and mold have height requirements due to elongation of parts at operating temperatures. This makes for lower mold original cost and lower maintenance costs.

Air and vacuum are so separated as to provide for forming the glass into the finished shape with less time involved by maintaining vacuum on the sleeve finish ring joint while the plunger is withdrawn. Also, counterblow will have begun so that at the moment of withdrawal a few ounces of pressure is already built up to sustain the surface of the glass recently vacated by the plunger against the weight of the glass in the mold cavity above it. Increase of counterblow pressure at a controlled rate gently moves the glass and quickly forms the parison, thus reducing the time element of "glass at rest at fill line" which largely determines the appearance of the settle wave. This type of operation clears a greater volume of glass from the neck of the bottle and thus makes it available for the critical areas of the container and permits lighter weight quality ware. This method also makes for better appearance of shoulders and will eliminate the vertical wave prevalent in counterblow bottles in line with the well-known fact that bottles with very small diameter plungers such as sprinkler finishes usually produce much improved appearance over containers with conventional openings on identical operations.

It has been established for a long time that it is desirable to retain the bottle in the finish ring during its entire cycle but previous attempts with a single finish ring per machine head could not have overlapping cycles (overlapping cycle is fabrication of the next parison in the parison mold while the present bottle is being blown in the blow mold). I use three finish rings per unit which provides a ring each at parison mold station, at blow mold station and at conveyor cooling station. Thus, a single 120° movement of the finish ring turret advances the parison to the blow mold, advances the finished bottle to the conveyor and advances the empty ring to the parison mold for the start of a new cycle. This arrangement provides for greater overlap of cycle than found in previous machines.

One of the previous mentioned advantages in carrying the bottle through the complete cycle is in final blowing. Conventional machines require blow heads with equalizing air passages to prevent bulging of the finish. Some of this equalizing air leaks between the parison neck and the mold and prevents the bottle from being solidly blown against the mold wall. This consequently lowers the efficiency of heat transfer from the ware, thus reducing the mold rate. The method I employ provides for accurate height of bottle through elimination of the blow head clearance which parison may or may not take up, and holds the finish vertical while the ware is being blown. This also eliminates cooked finishes which are becoming more and more troublesome on high speed filling lines.

A more perfect parison for producing a good bottle appearance-wise can be had by inverting while in the parison mold rather than having to freeze the parison sufficiently for open air inversion.

Each unit of a multiple-unit machine is a separate glass machine capable of functioning independently of the others and facilities are provided to permit changing a unit on the base while the remaining units continue in operation. This makes possible preventive maintenance and consequent continuing high quality ware.

A take-out device is eliminated and there is no ware sliding and no pusher arrangement is required.

My air feeder time is designed such that all core movements are cammed using the air supply to cause core to follow the cam and this design is superior to trip valve types in that it eliminates the variables in bouncing of spool valves and provides much more satisfactory air feeder operation.

Still a further object is to provide a machine designed for hydraulic operation to secure the steady, unvarying motions which are associated with hydraulic power and impossible of attainment with air operated machines, and to provide greater forces for locking equipment in small space. My herein disclosed design has all hydraulic lines and connections enclosed entirely within a mechanism case and there is no possibility of line or fitting breakage resulting in the spraying of oil on hot glass or hot mold or other equipment and causing a fire. Therefore, it is possible to use ordinary hydraulic oils (flammable type, which has considerable lubricity) to secure maximum working life for the various parts of the hydraulic system.

Still a further object is to provide a novel counterblow method wherein a plunger mechanism is provided in which a vacuum serving match between the plunger and the sleeve and that serving the ring sleeve match are separated so that vacuum can be retained on the ring sleeve match while the beginning counterblow expands the plunger bubble. This has been proved advantageous in filling finishes, clearing glass out of the neck and improving distribution of the glass through the reduction of the "settle wave." This feature is of great importance in the production of high quality ware at high speeds.

An additional object is to provide timer controlled operations wherein cycle changes are permitted to suit the ware involved, the invert and transfer which might interfere if improperly timed being hydraulic motor driven with insufficient power to cause machine breakage.

Another additional object is to provide a glass-ware forming machine which meets the requirements of the container manufacturing industry. That industry has come to understand that speed is only one function in the cost of producing a piece of ware. Quality of product, high mechanical efficiency, machine and mold life are equally important factors. The present machine was designed for and tests have proved that mold rates could be equal to or greater than those considered first in the industry and are decisive advantages and factors of importance capable of being realized with the machine herein disclosed.

Still another additional object is to provide a method of forming glassware involving the use of a single neck ring initially coacting with a parison mold during charging of the mold, during counterblowing therein and during reverting thereof; during transfer to a blow station and during the blowing of the ware at that station; and during transfer to a conveyor station and during release of the ware at that station whereupon the finish ring returns to the charging station where the parison mold has been inverted to its original position after the previous parison was counterblown therein.

With these and other objects in view, my invention consists in the construction, arrangement and combination of the various parts of my glassware forming machine and in the method of forming glassware with my machine whereby the objects above contemplated are attained, as hereinafter more fully set forth, pointed out in my claims and illustrated in detail on the accompanying drawings, wherein:

Fig. 6 is taken.

Fig. 24 is a similar diagrammatic view for an index pin of the turret.

Figures 37, 38, 39, 40:
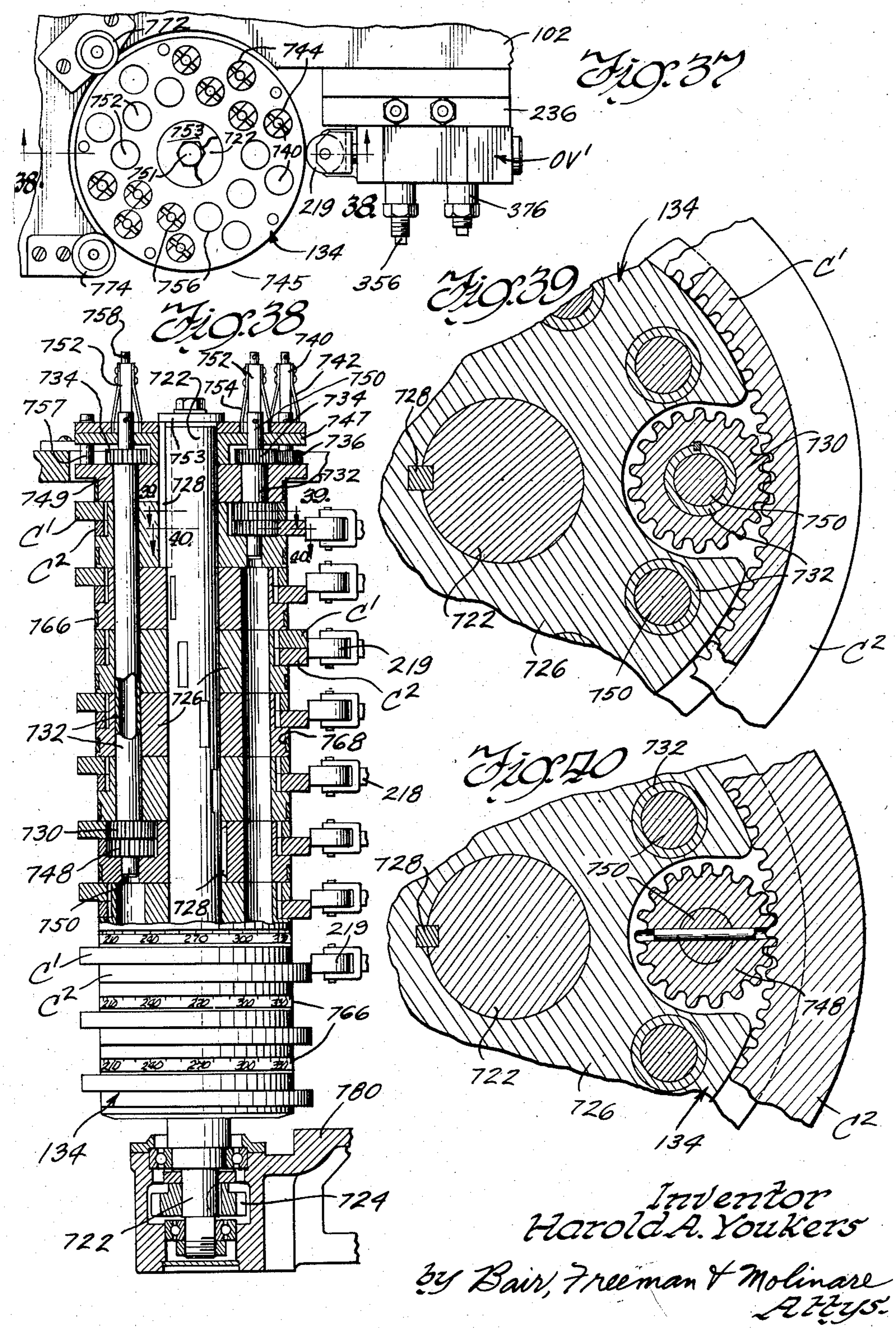
Fig. 37 is an enlarged plan view of one of the timers for oil and air valves of my machine.
Fig. 38 is a further enlarged vertical sectional view thereof on the line 38—38 of Fig. 37.

Figs. 39 and 40 are enlarged sectional views on the lines 39—39 and 40—40, respectively, of Fig. 38 showing cam adjusting mechanisms of the timer.

Figure 41:
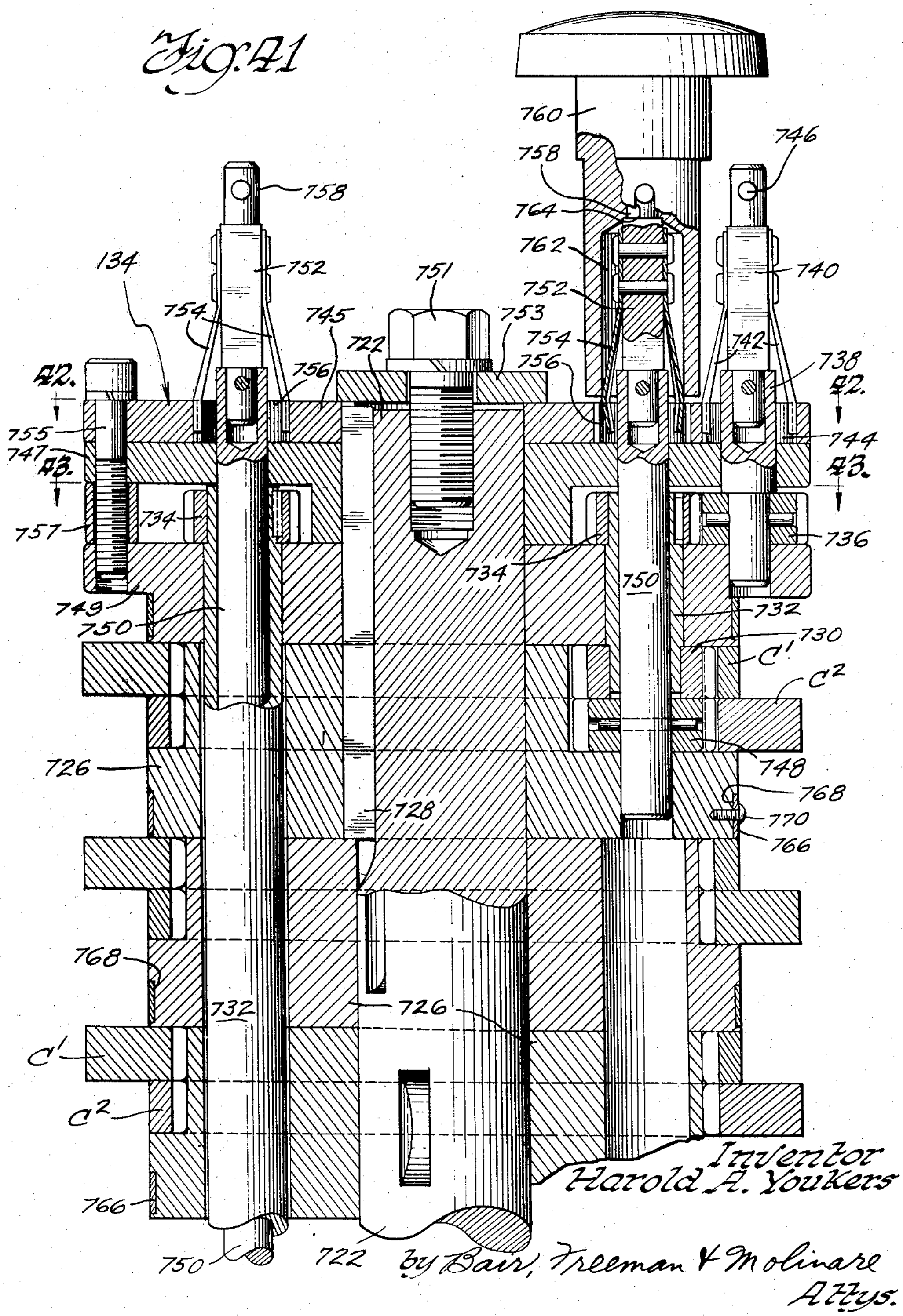

Fig. 41 is a further enlarged vertical sectional view of the top of the timer shown in Fig. 38 to illustrate various operative connections between an adjusting knob and cams of the timer.

Figure 42:
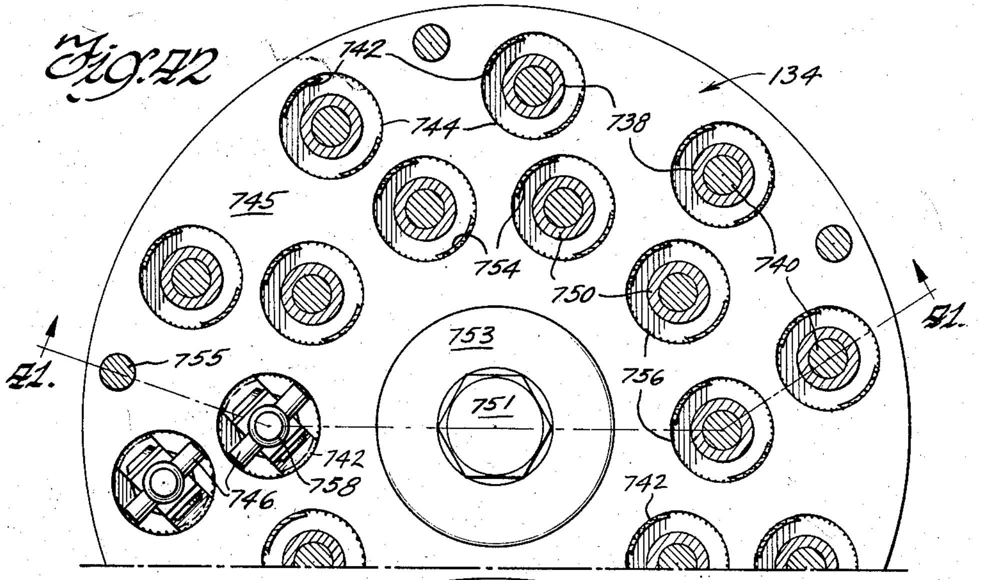
Figure 43:
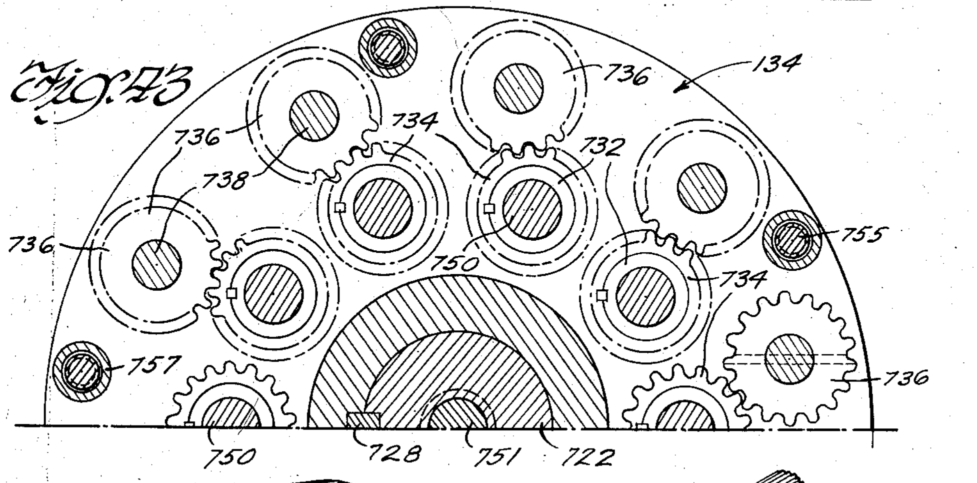

Figs. 42 and 43 are horizontal sectional views on the lines 42—42 and 43—43 respectively of Fig. 41, the section line 41—41 of Fig. 42 indicating where Fig. 41 is taken on Fig. 42.

Figure 44:
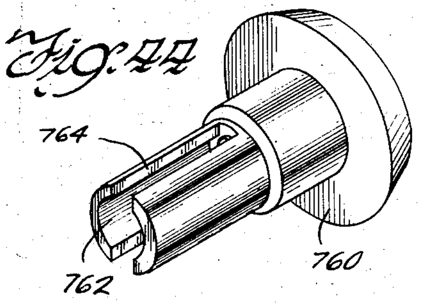

Fig. 44 is a perspective view of an adjusting knob for the timer cams.

Figure 45:
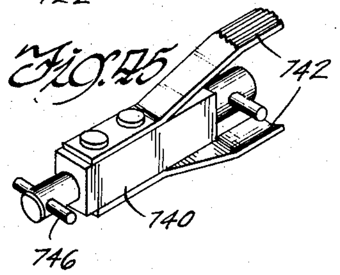
Figures 76, 77, 78:
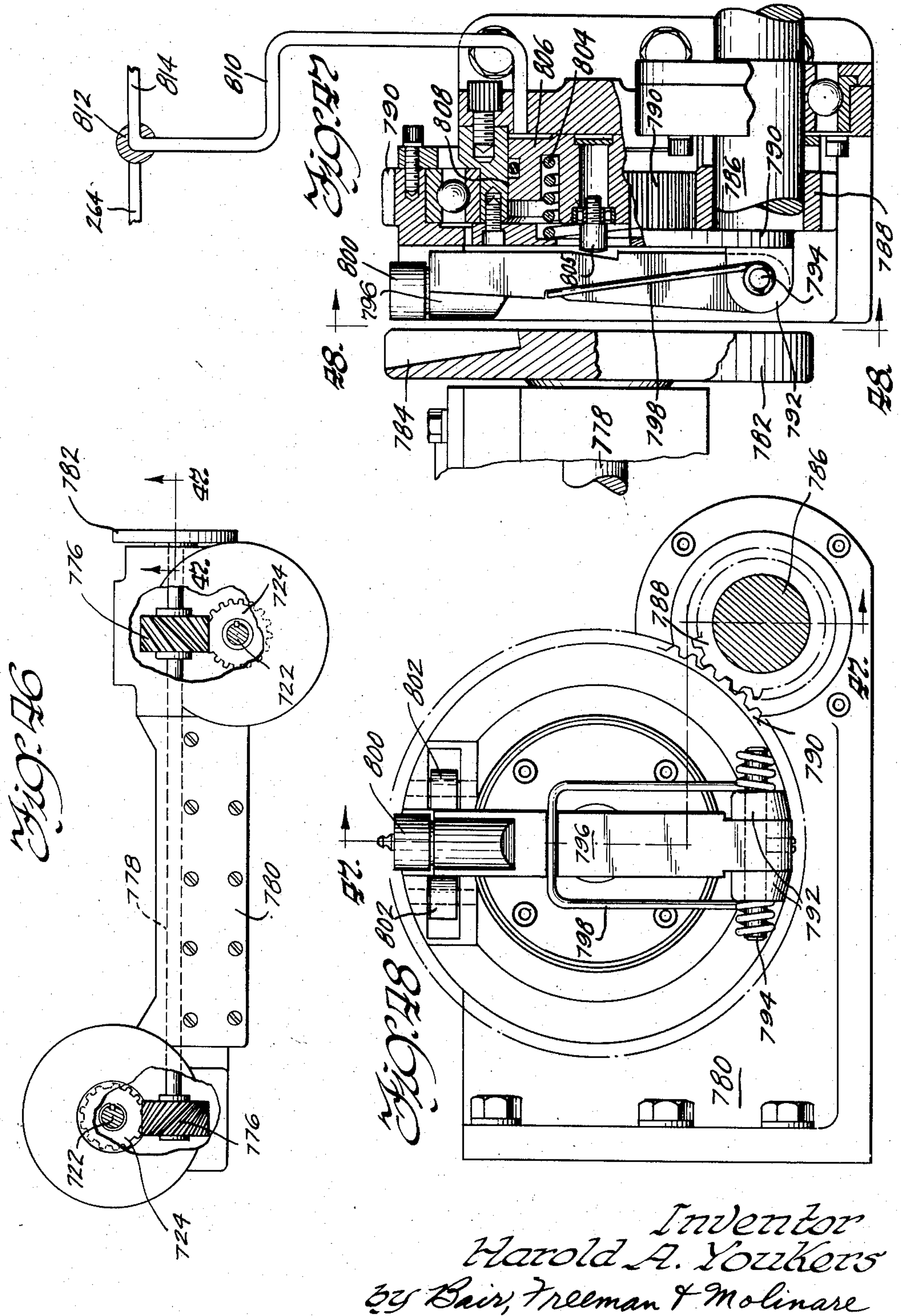
Figure 29:
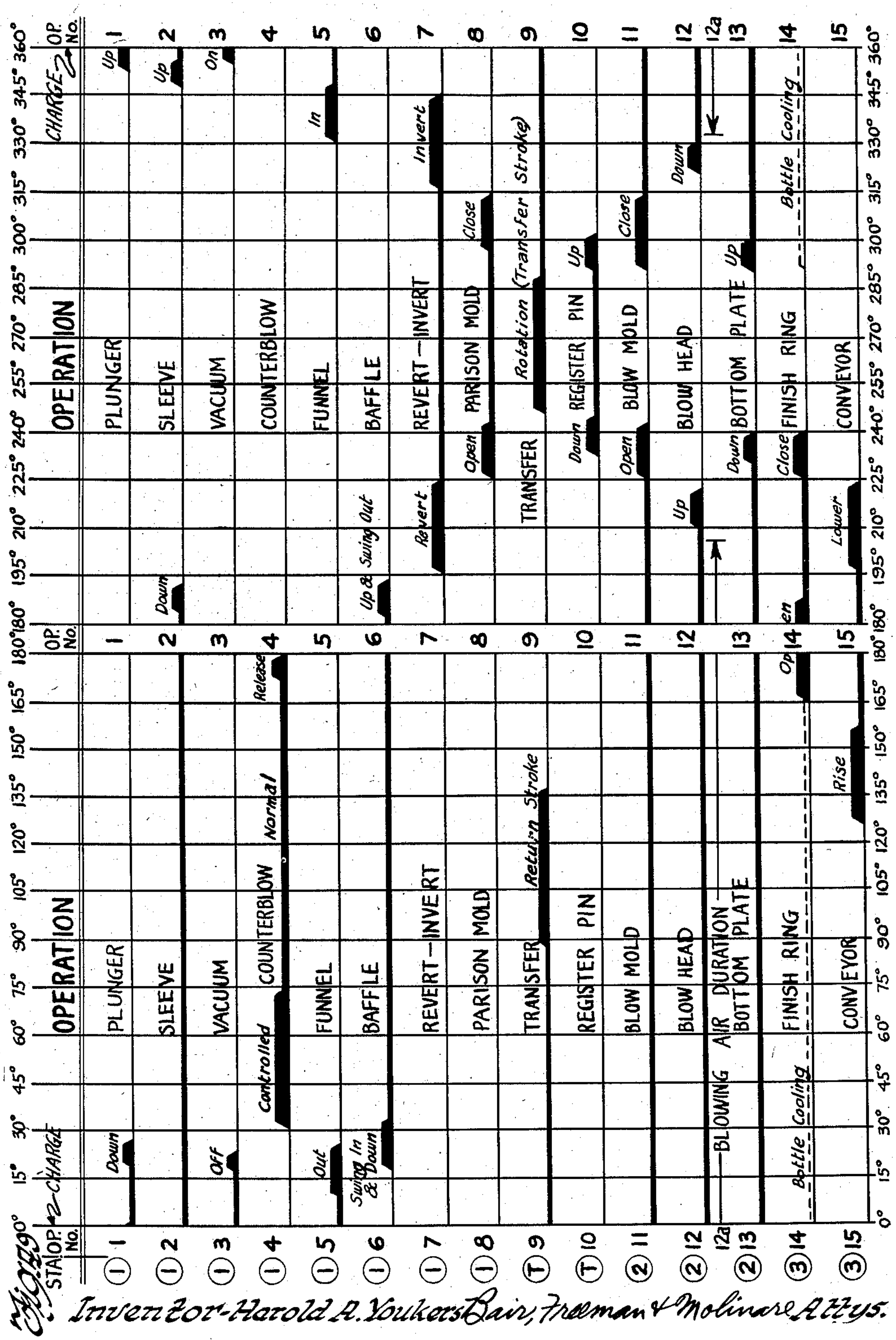

Fig. 45 is a perspective view of a locking means for one of the timer cams.

Fig. 46 is a plan view of a timer shaft housing with portions broken away to show the drive from a timer drive shaft to a pair of timer shafts.

Fig. 47 is an enlarged vertical sectional view as taken on the line 47—47 of Fig. 46 and shows details of a drive clutch for the timer drive shaft.

Fig. 48 is a vertical sectional view on the line 48—48 of Fig. 47, the line 47—47 indicating where Fig. 47 is taken on Fig. 48; and Fig. 49 is an operations diagram outlining the various operations of my glassware forming machine and includes a timing chart therefor covering one cycle of operation for one type and/or size of ware.

Figure 1:
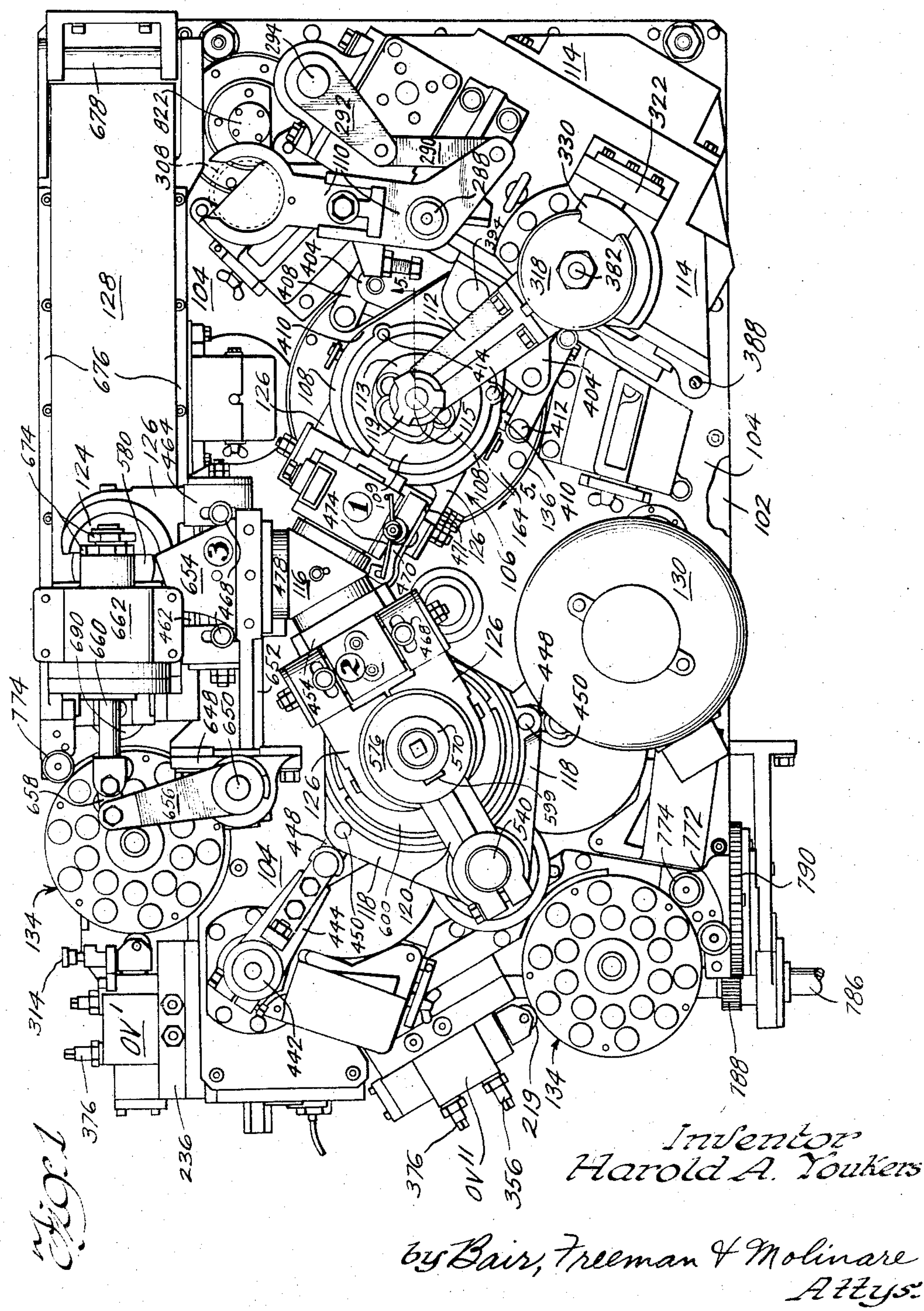
Fig. 1 is a plan view of a glassware forming machine embodying my invention.
Figures 1A, 2:
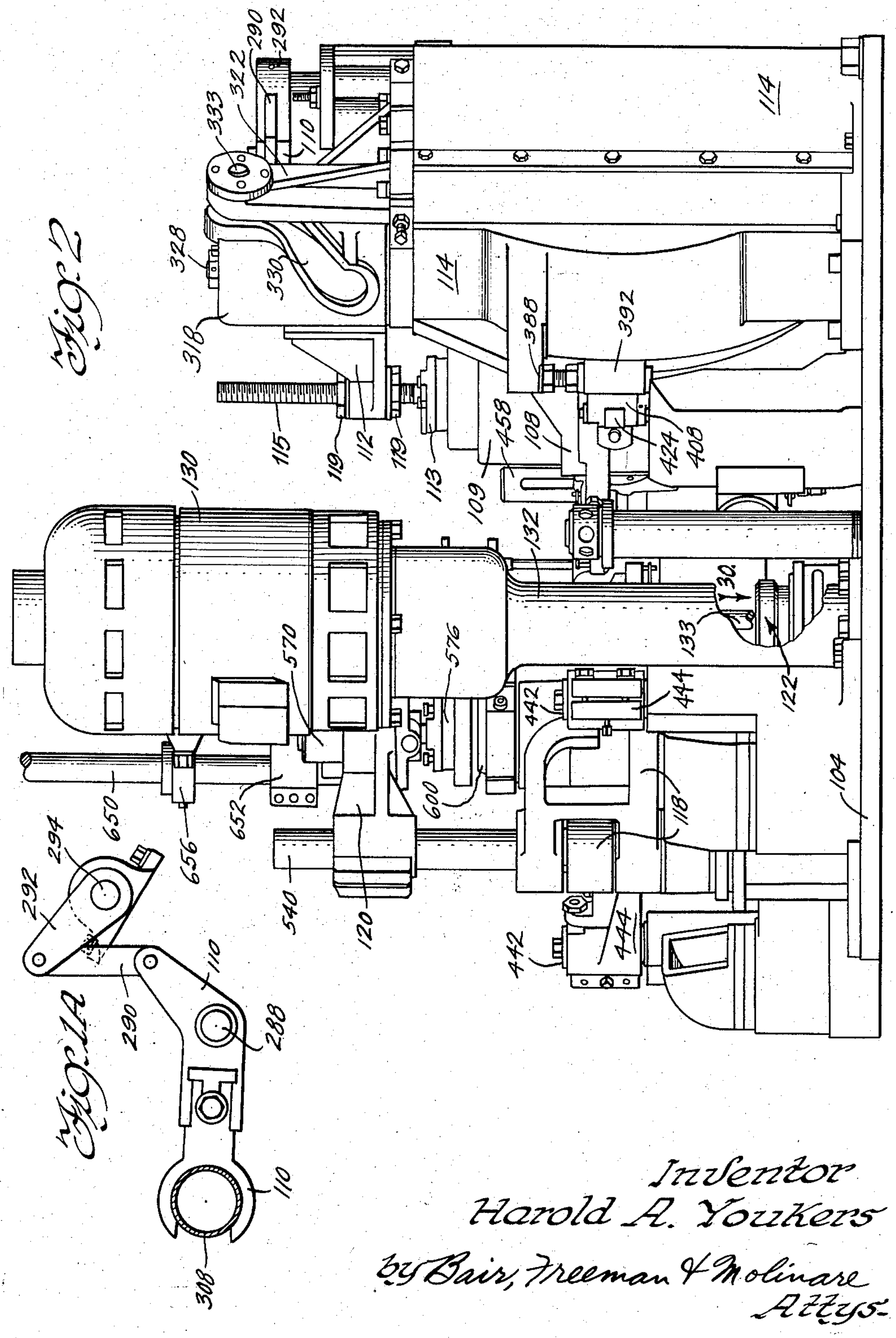
Fig. 1A is a partial plan view showing mechanism at the right hand end of Fig. 1 in a different position.
Fig. 2 is a side elevation of the upper half of the machine down to the bottom surface of a cover plate for a mechanism housing.
Figure 3:
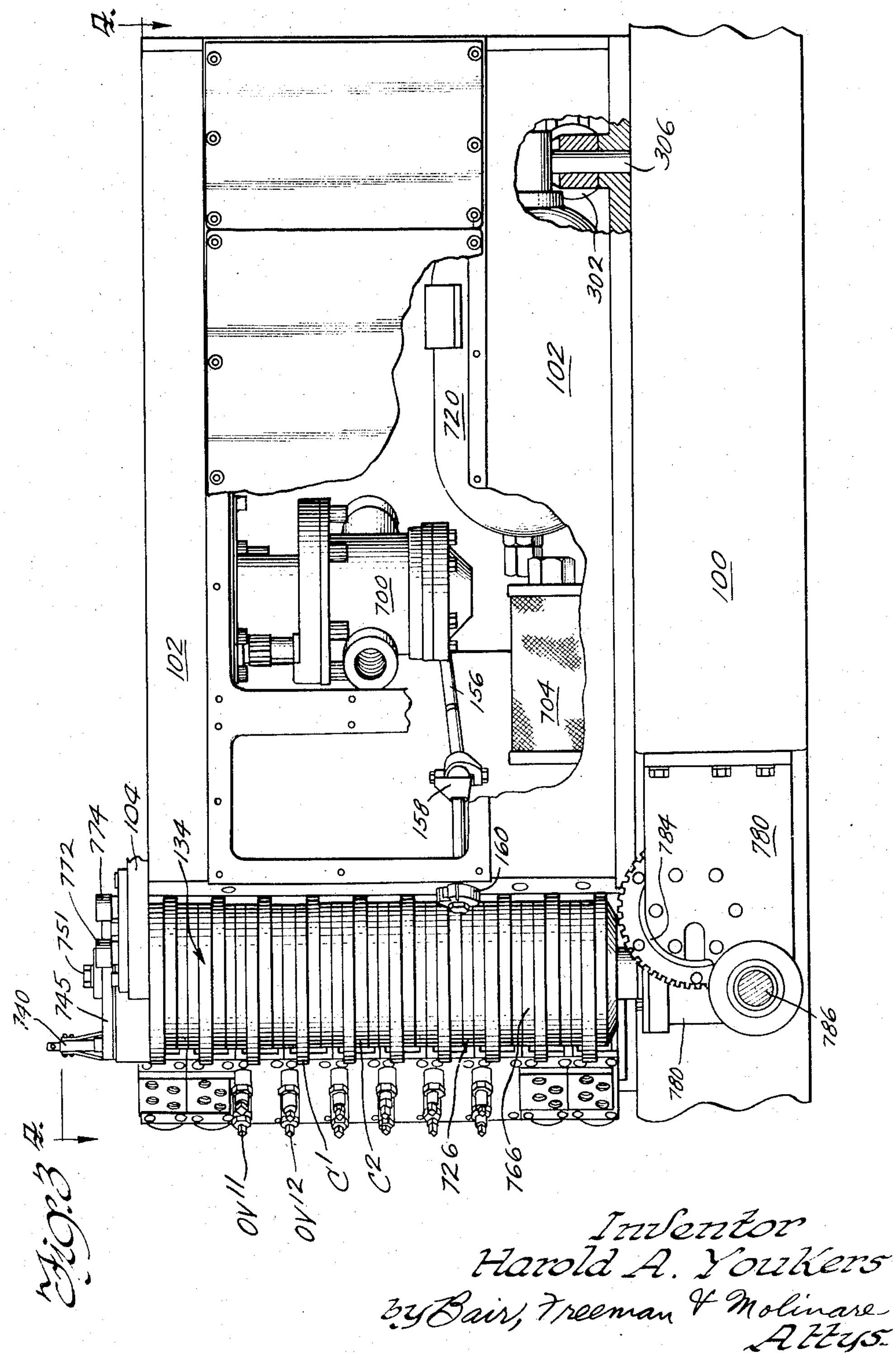
Fig. 3 is a side elevation of the mechanism housing and is a continuation of the lower end of Fig. 2, a side cover plate being removed and a portion of the housing being broken away to show details.
Figure 4:
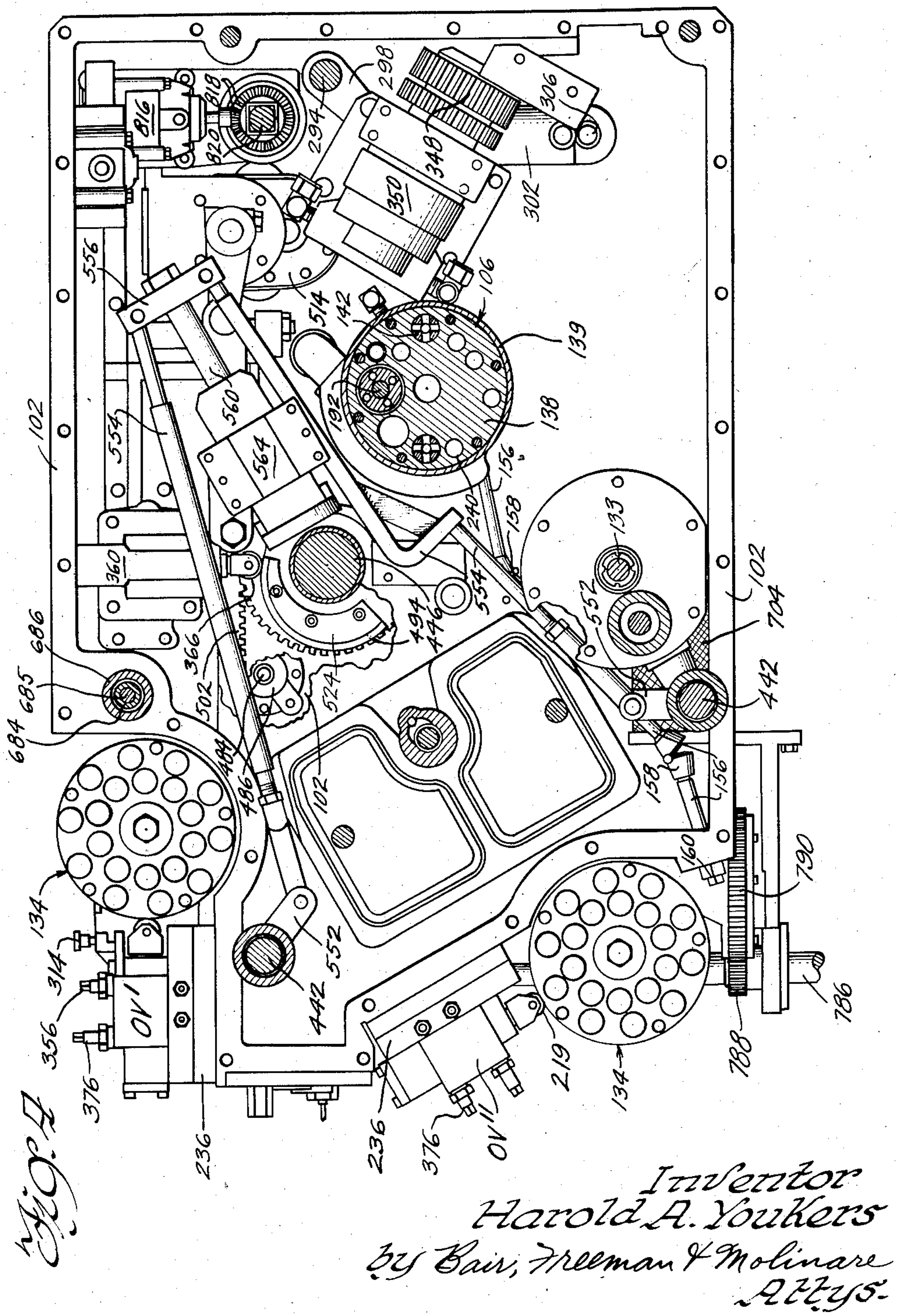
Fig. 4 is a horizontal sectional view through the machine at the top of Fig. 3 as indicated by the line 4—4 thereon.

In describing the accompanying drawings I will first describe in general the main exterior operating mechanisms in Figs. 1, 2 and 3 and then the main internal mechanisms shown in Fig. 4 before going into detail with respect to each of the various mechanisms.

Referring to Fig. 3, I provide a suitable supporting base 100 on which is mounted a substantially rectangular mechanism case 102. The top of this case is closed by a cover plate 104.

A plunger, sleeve, vacuum and counter-blow mechanism is shown in section and generally at 106 on Fig. 4. On the same center a pair of parison mold holders 108 are shown in Fig. 1. There is also shown in Fig. 1 an oscillatable funnel supporting arm 110 and an oscillatable baffle supporting arm 112.

Figs. 1 and 2 disclose a revert-invert mechanism housing 114 which houses mechanism for reverting and inverting the parison mold carried by the holders 108 as will hereinafter be disclosed.

At 116 I disclose a turret head which is indexible 120° per cycle of operation of the machine and around the turret head 116 I have indicated by reference characters in circles three stations (1) (2) and (3). The three stations referred to are, respectively, a parison blowing station, a finish blowing station, and a conveyor station. It will be noted that the parison mold holders 108 are at station (1).

At station (2) there are a pair of blow mold holders 118 and a blow head supporting arm 120. Below the holders 118 there is a bottom plate 122 shown in a broken-away portion of Fig. 2. At each of the stations (1), (2) and (3) is a split finish ring 124 and each half of the ring is supported by a finish ring supporting arm 126. At 128 I illustrate a conveyor for receiving the ware and delivering it to a second conveyor that services a plurality of the unitary machines, one of which I am herein describing. The second conveyor delivers the ware to the annealing lehr.

Various mechanisms are mounted in the mechanism case 102 for operating the instrumentalities above described and a hydraulic system including a pump is provided for this purpose as will hereinafter be described. This pump is driven by an electric motor 130, the shaft 133 of which extends downwardly through a housing 132 that mounts the motor on the cover plate 104 as shown in Fig. 2. A pair of timers 134 are provided for timing the operations of the various parts of the machine, as will hereinafter appear in accordance with a timing chart shown in Fig. 49.

PLUNGER, SLEEVE, VACUUM AND COUNTER BLOW MECHANISM (106)

Figures 5, 6, 7:
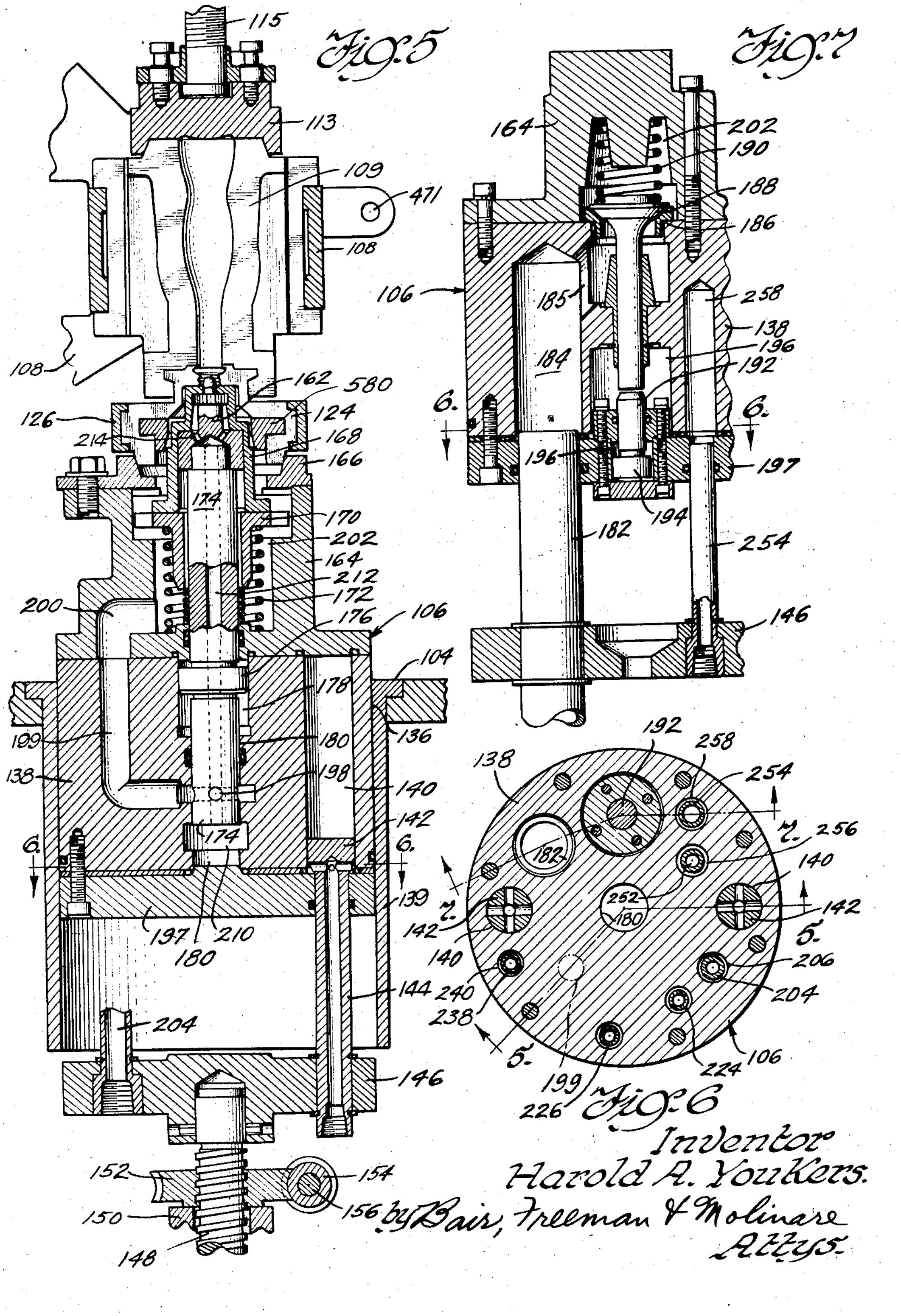
Fig. 5 is an enlarged vertical sectional view on the lines 5—5 of Figs. 1 and 6 showing the details of a plunger and sleeve mechanism and associated parts.
Fig. 6 is a horizontal sectional view thereof on the line 6—6 of Fig. 5.
Fig. 7 is a vertical sectional view on the line 7—7 of Fig. 6 and includes a line 6—6 to indicate where

This mechanism and its operation are shown particularly in Figs. 5 to 11. As shown in Fig. 5, the cover plate 104 is provided with a circular opening 136 in which a cylindrical body 138 for suporting the mechanism just referred to is slidably mounted for vertical movement. The body 138 is vertically slidable in a cylinder barrel 139. To accomplish such movement a pair of cylinder bores 140 are provided in the body 138 receiving pistons 142 at the tops of piston rods 144. The lower ends of these rods are anchored in a plate 146 from which depends a threaded adjusting rod 148 slidably entering a boss 150 extending upwardly from the bottom of the mechanism case 102. A worm gear 152 is threaded on the rod 148 and meshes with a worm 154 on a worm shaft 156. As shown in Fig. 3 the worm shaft 156 extends through a pair of universal joints 158 to an adjusting knob 160 on the exterior of the mechanism case.

At 162 a plunger is shown (for forming the interior of the neck of the ware) and at 164 a head for the body 138 is shown. The head 164 is supported on the upper end of the body and, in turn, supports a vacuum plate 166 for coaction with the finish ring 124 which is provided for forming the exterior of the neck of the ware. Within the neck ring 124 is a floating guide ring 580.

The body 138 and its head 164 are adapted to operate a sleeve 168 that cooperates with the plunger 162 in the formation of the neck of the ware as will hereinafter appear and this is accomplished through a tubular flanged sleeve support 170 and a spring 172.

The plunger 162 is carried by the upper end of a rod 174 carrying a piston 176 intermediate its ends in a bore 178 of the head 138. The piston is for hydraulically raising and lowering the plunger 162. The lower end of the rod 174 below the piston 176 is slidable in a counter bore 180 of the head 138 for guide purposes.

A vacuum supply pipe 182 is provided (see Fig. 7) extending into a cavity 184 of the body 138. This cavity communicates through a passageway 185 with a vacuum valve seat 186 on which is normally seated a vacuum valve 188 under the action of a spring 190. A piston rod 192 is provided for opening the vacuum valve 188 and is part of a piston 194 in a bore 196 of a bottom plate 197 for the body 138.

Figure 10:
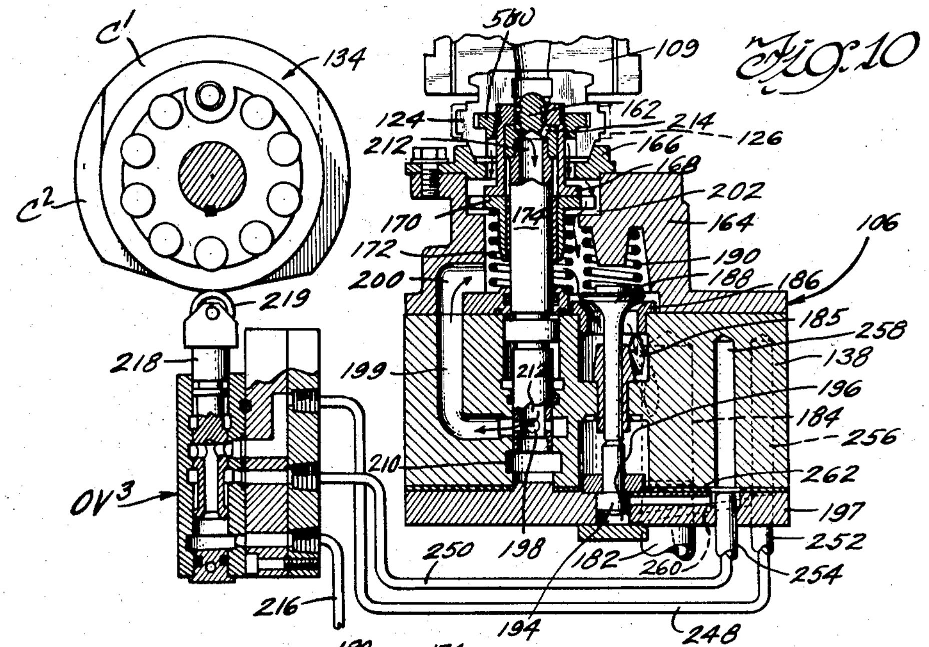
Fig. 10 is a diagrammatic view similar to Fig. 8 showing a vacuum valve operating mechanism.

Referring to Fig. 5, a passageway 199 in the body 138 is provided for slide valve coaction with a port 198 of the rod 174 and the passageway 199 communicates by means of a passageway 200 with a cavity 202 surrounding the sleeve support 170 and the sleeve 168 and also on the inlet (top) side of the vacuum valve 188 as somewhat more clearly shown in Fig. 10.

In Fig. 6 a counterblow air supply pipe 204 is shown and this communicates by means of a bore 206 in the body 138 (see Fig. 11), with a passageway 208 and a cavity 210 that is located at the lower end of the bore 180 for the rod 174. This rod is hollow, having a bore 212 extending from the ports 198 to ports 214 in the plunger 162. At times this bore 212 receives counterblow air and at other times vacuum is drawn through it, as will hereinafter be described.

*Operation of plunger 162*

Figure 8:
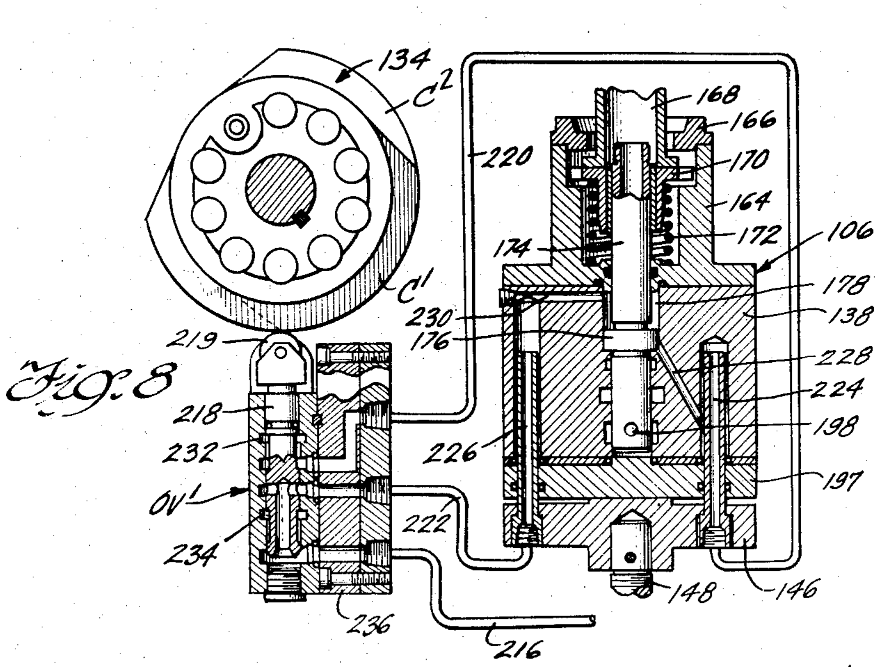
Fig. 8 is a diagrammatic view showing a plunger operating mechanism and includes a hydraulic timer valve and its actuating cams.

Referring to Fig. 8, an oil valve $OV^1$ is shown which is supplied with oil under pressure from an oil supply pipe 216. This valve includes a valve plunger 218 normally biased toward cams $C^1$ and $C^2$ of one of the timers 134 and carries a roller 219 for coaction with these cams. The two cams can be adjusted relative to each other for determining the time during a cycle of operation of the machine that the plunger 218 will be depressed and the mechanism for accomplishing this will be described later. The roller is biased into engagement with the cams by the oil pressure from 216 acting on the plunger 218.

The valve $OV^1$ has an up pipe 220 extending therefrom and a down pipe 222 also extending therefrom to an up post 224 and a down post 226 carried by the plate 146 and entering the body 138 wherein they communicate by passageways 228 and 230 with the bore 178 for the piston 176, below and above the piston. When the parts are in the position shown in Fig. 8, oil from 216 flows through the valve $OV^1$ to the pipe 222 and then through 226 and 230 to the bore 178 above the piston 176 for lowering it, and thereby likewise lowering the rod 174 and the plunger 162 carried by its upper end (see Fig. 10). Conversely, when the valve plunger 218 is in its upper position caused by the drop of the roller 219 off the cam $C^1$—$C^2$ the oil will flow through 220, 224 and 228 to the bore 178 below the piston 176 for raising the plunger 162.

When the valve plunger 218 is in the position shown in Fig. 8 the return oil from 220 is exhausted through 232 and suitable piping back into the mechanism case 102 which serves as a reservoir therefor and when the valve is reversed and oil returns from 222 it similarly exhausts through 234 back into the mechanism case 102. This is accomplished by suitable passageways in a manifold 236 on which the oil valve $OV^1$, and others to be later described, are mounted, there being one of the manifolds for each of the timers 134.

Figure 9:
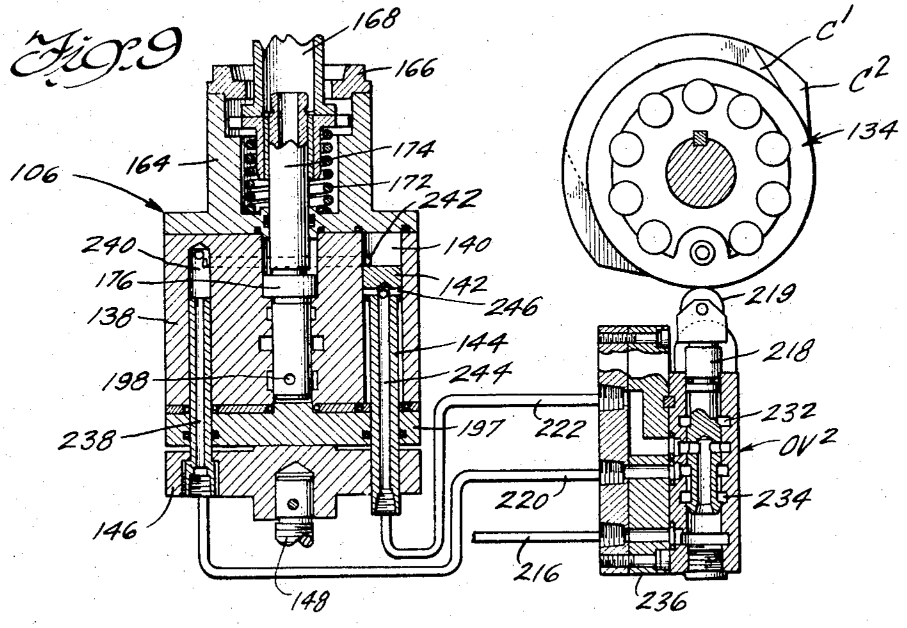
Fig. 9 is a diagrammatic view similar to Fig. 8 showing a sleeve operating mechanism.

For raising and lowering the cylinder body 138, and thereby the sleeve 168, I provide an oil valve $OV^2$ shown in Fig. 9 similar in construction to the oil valve $OV^1$ and therefore having parts bearing the same reference numerals including the oil supply pipe 216. The up pipe 220 leads to an up post 238 anchored in the plate 146 and extending into a bore 240 of the body 138 which communicates by a passageway 242 with the bore 140 for the piston 142 above that piston so that when oil is pumped into the bore 140 it will cause upward movement of the body 138 and thereby the head 164 and the plunger 168. As described in connection with Fig. 6, there are two of the bores 140 diametrically opposite each other. The passageway 242 just referred to extends to both of them.

The down pipe 222 extends to both of the piston rods 144 which are hollow as indicated at 244 and provided with cross passages 246 to supply oil under the pistons 142 for lowering the body 138. The exhaust ports 232 and 234 receive the return oil from the pipes 222 and 220, respectively, as already described in connection with the oil valve $OV^1$.

Referring to Fig. 10, an oil valve $OV^3$ is shown which is similar to the valves $OV^1$ and $OV^2$ and actuated by other cams $C^1$ and $C^2$ of the timer 134 in substantially the same manner. This valve controls the actuation of the vacuum valve 188 of Fig. 7 by means of a vacuum on pipe 248 and a vacuum off pipe 250 which communicate with a vacuum on post 252 and a vacuum off post 254 anchored as shown in Fig. 7 in the plate 146 and received in cavities 256 and 258 of the body 138.

As shown in Fig. 10, the cavity 256 communicates by means of a passageway 260 with the cylinder 196 below the piston 194 therein while the cavity 258 communicates by means of a passageway 262 with the bore 196 above the piston 194 therein. Obviously, therefore, when oil is delivered through the vacuum on pipe 248 it will force the piston 194 upwardly and thereby the vacuum valve 188 open as shown in Fig. 10, whereas, to close the vacuum valve oil is forced through the vacuum off pipe 250. The space around the sleeve 168 is thereby evacuated as indicated by arrows for producing a vacuum in the finish ring 124 that settles the gob of glass down into the finish ring and around the plunger 162. At the same time, the plunger is subject to vacuum through the bore 212 of the piston rod 174 and the ports 199, 198 and the passageway 200. In the position illustrated, the plunger is up, whereas, when it is lowered as in Figs. 8 and 9, the ports 199 are out of register with the ports 198 and in register with the cavity 210 for counterblowing purposes, as will hereinafter appear.

Figure 11:
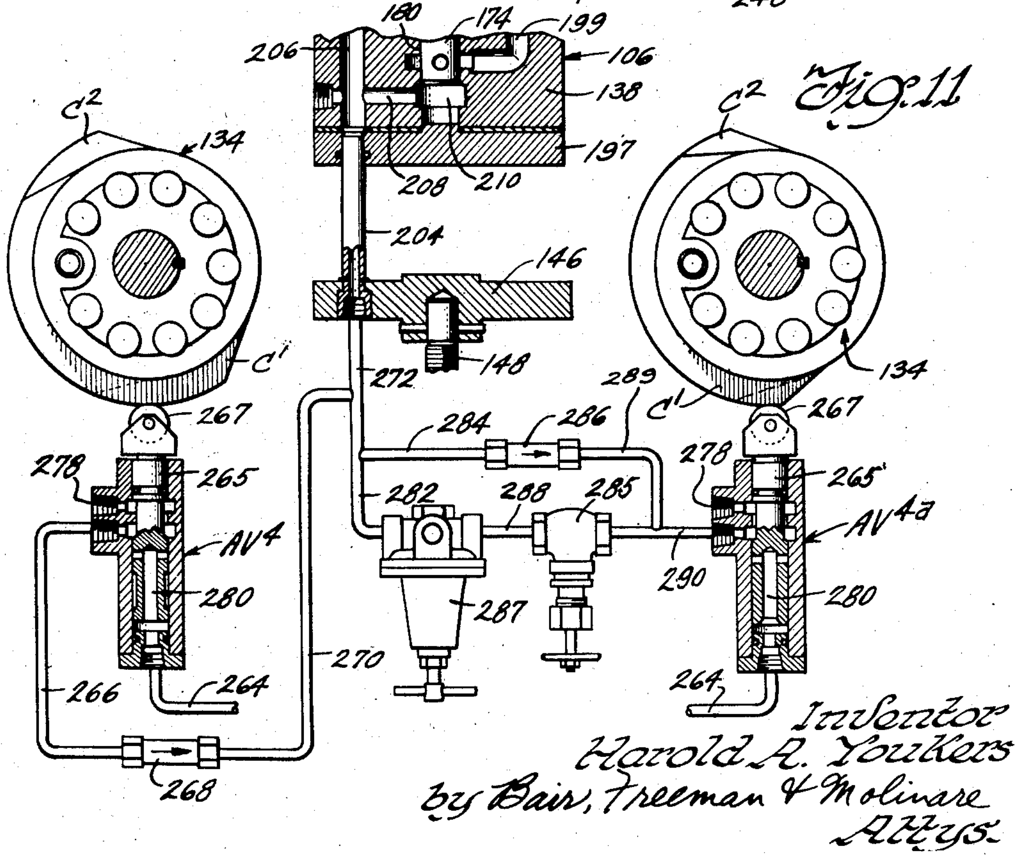
Fig. 11 is a diagrammatic view showing a counterblow valve operating mechanism and includes a pair of air timer valves and their actuating cams.
Figure 12:
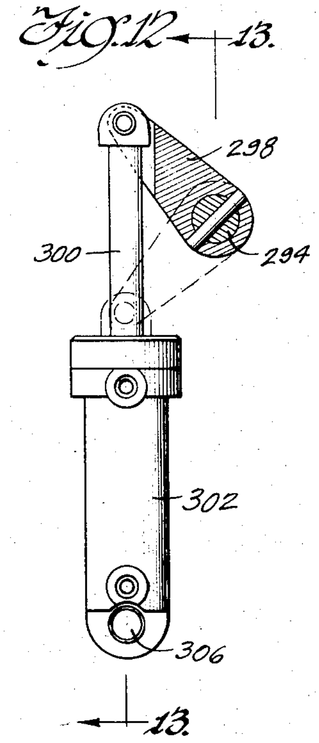
Fig. 12 is a plan view of a funnel actuating mechanism.

Referring to Fig. 11, an air valve $AV^4$ is shown to which air is supplied by an air supply pipe 264. This valve has a plunger 265 and a roller 267 for contacting the cams $C^1$ and $C^2$ of the timer 134. Counterblow air is supplied from the valve $AV^4$ through a pipe 266, a check valve 268 and pipes 270 and 272 to the counterblow air supply post 204 entering the bore 206 for supplying air through the passageway 208 to the cavity 210 and thereby into the lower end of the piston rod 174.

The air valve $AV^4$ in the position shown in Fig. 11 is exhausting at 278. When the roller 267 is dropped by the cams $C^1$ and $C^2$ air pressure forces the plunger 265 upwardly so that a cavity 280 in the valve plunger communicates with the pipe 266.

Also in Fig. 11 I show a counterblow release valve $AV^{4a}$ which is also for air and similar to the valve $AV^4$. In the position shown it is allowing counterblow air to be rapidly exhausted from the pipe 272 to pipes 282 and 284, a check valve 286 and pipes 288, 289 and 290 to atmosphere through the exhaust 278. In the other position of the valve $AV^{4a}$ air is admitted from the air supply pipe 264 and the cavity 280 to the pipe 290 from which it flows through a needle valve 285 for adjusting the flow and a regulator valve 287 for adjusting the pressure of the flow from which it flows into the pipes 282 and 272. This arrangement gives a controlled counterblow as will hereinafter more fully be described.

*Operation of funnel supporting arm 110*

Referring to Figs. 1, 1A, 12 and 13, the funnel supporting arm 110 is pivoted at 288 and is operatively connected by a link 290 to an arm 292 secured to a vertical rock shaft 294. The rock shaft extends down into the mechanism case 102 as shown in Fig. 4 and its lower end is journaled in a bearing 296 mounted in a boss upstanding from the bottom of the case 102 (see Fig. 13). Above this bearing a lever 298 is secured to the shaft and the outer end of the lever is pivoted to a piston rod 300 extending into a cylinder 302. The piston rod has a piston 304 thereon within the cylinder and the cylinder is pivoted at 306. When the piston 304 is retracted, as in Fig. 13 (dash-line position of Fig. 12), the funnel supporting arm 110 assumes the position shown in Fig. 1, whereas, when it is extended as in Fig. 12 (solid-line position) the funnel supporting arm assumes the position shown in Fig. 1A and carries with it the funnel 308 through which the gob of glass is introduced to the parison mold held in the parison mold holders 108.

For controlling the reciprocations of the piston 304 I provide an oil valve $OV^5$ (see Fig. 13) which, in the position shown, permits oil from the supply line 216 to flow through a funnel out pipe 310 to retract the piston as shown, the return oil passing through a funnel in pipe 312 and exhausting for returning to the sump through the outlet port 232. When the cams $C^1$ and $C^2$ of the timer 134 reverse the valve $OV^5$ so that oil pressure raises it from the position shown, the oil from 216 flows through 312 to extend the piston 304 as in Fig. 12 and thereby move the funnel supporting arm 110 to the funnel in position shown in Fig. 1A, return of the oil at that time being through the pipe 310 and out of the outlet 234 to the sump.

Figure 13:
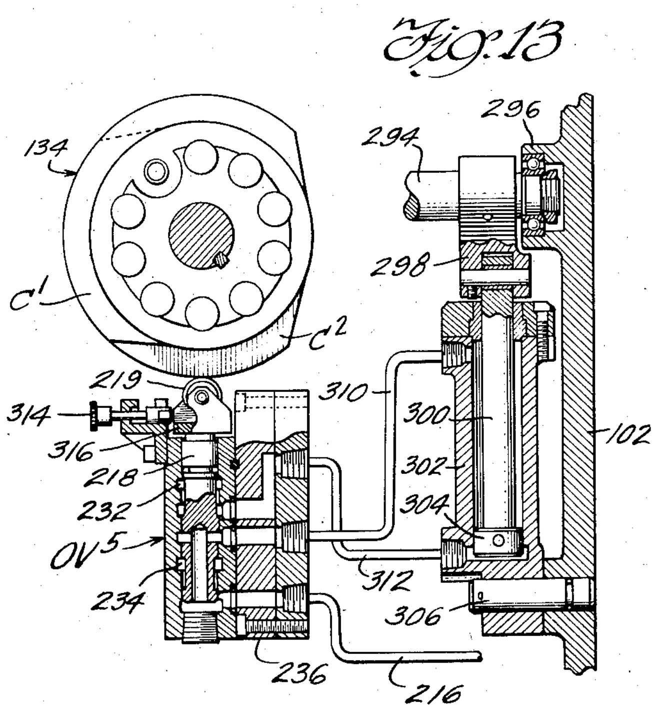
Fig. 13 is a sectional view thereof on the line 13—13 of Fig. 12 and shows diagrammatically an oil timer valve for the funnel operating mechanism together with its actuating cam.

The oil valve $OV^5$ is similar to the oil valves thus far described with the addition of a latch 314 whereby the valve may be latched in the position shown in Fig. 13 by pressing the latch inwardly to overhang a shoulder 316 of the valve plunger 218 when it is desirable to keep the funnel out, as, for instance, when making adjustments on the machine.

*Mechanism for operating baffle supporting arm 112*

Figure 14:
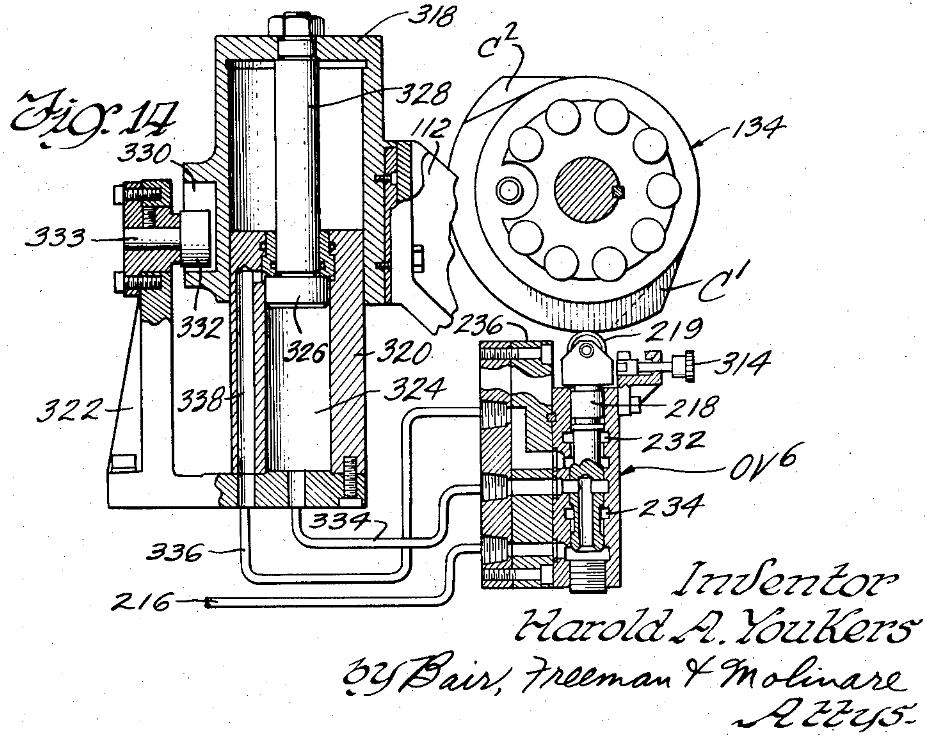
Fig. 14 is a diagrammatic view similar to Fig. 13 showing a baffle operating mechanism.

Referring to Fig. 14, a guide cylinder 318 is provided for the baffle supporting arm 112 and is vertically slidable and oscillatable on a tubular post 320 supported by a bracket 322. The bracket 322 is in turn supported on the housing 114 as shown in Fig. 2.

The post 320 has a cylinder bore 324 in which is a piston 326 on the lower end of a piston rod 328. The upper end of the piston rod 328 is anchored in the top of the guide cylinder 318. The guide cylinder is provided with a cam groove 330 receiving a roller 332 on a shaft 333. The shaft 333 is supported by the bracket 322.

I provide an oil valve $OV^6$ for controlling the operating of the baffle support on arm 112 which is similar to the previously described oil valves and has an up pipe 334 and a down pipe 336 connected to the lower end of the cylinder 324 and to the upper end thereof by a passageway 338. In the position shown in Fig. 14, oil is being received from the supply pipe 216 and is passing through the up-pipe 334 into the cylinder 324 for elevating the guide cylinder 318 and thereby the arm 112. At the same time this arm is given an oscillating motion due to the coaction of the groove 330 with the roller 332.

The return oil from 336 is discharged through 232 as already described in connection with the previous oil valves and a latch 314 similar to that shown on the oil valve $OV^5$ is provided to lock the valve $OV^6$ against operation during adjustments of the machine.

*Operation of revert-invert mechanism in housing 114*

Figure 15:
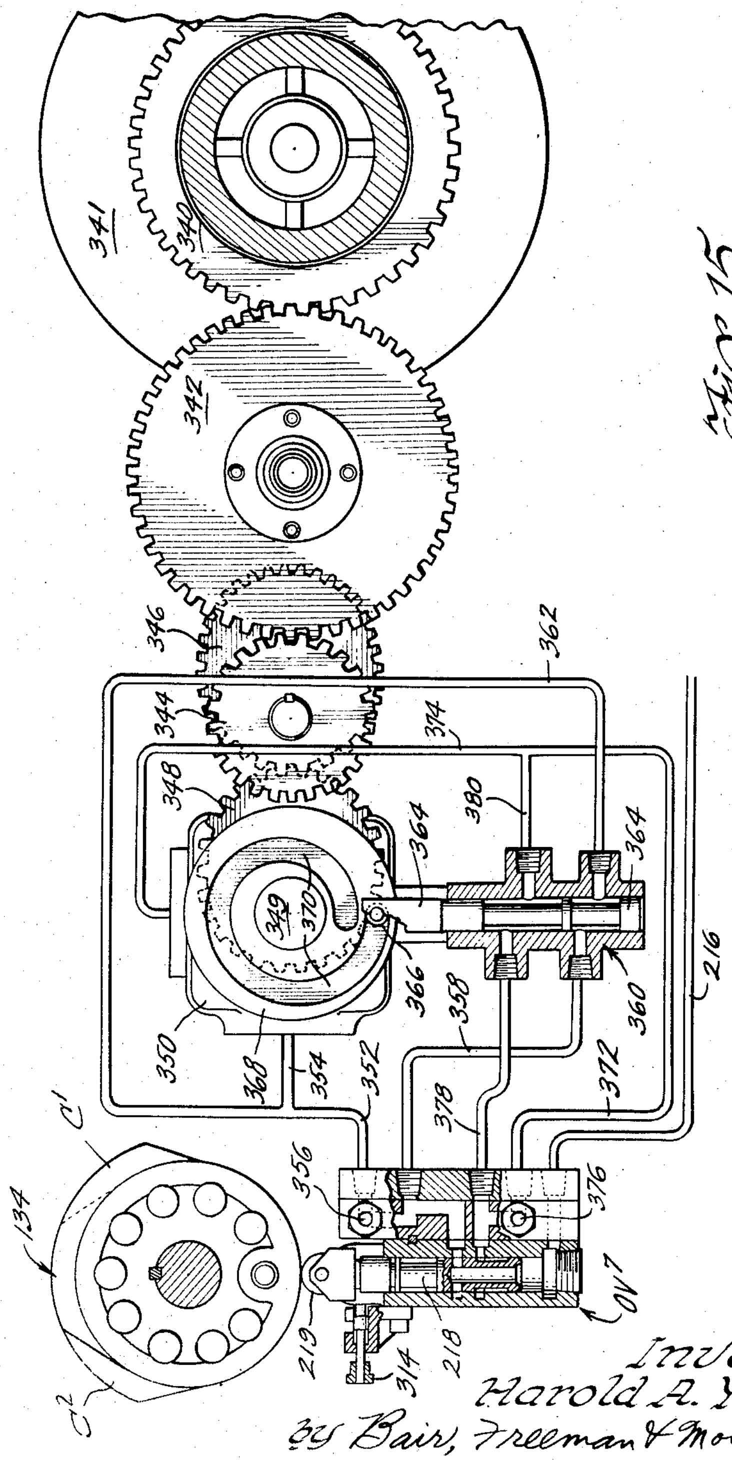
Fig. 15 is a diagrammatic view similar to Fig. 13 showing a parison mold reverting and inverting mechanism.

Referring to Fig. 15, the revert-invert mechanism (indicated diagrammatically at 341 and which will presently be described) is driven by a gear 340. An idler gear 342 meshes therewith and in turn meshes with a pinion 344. The pinion 344 rotates simultaneously with an ellipitical gear 346 which is meshed with another elliptical gear 348 on the shaft 349 of a hydraulic motor 350.

An oil valve $OV^7$ controlled by one of the timers 134 receives oil under pressure from the pipe 216 and in the position shown conveys it to revert oil pipes 352 and 354 extending to one side of the hydraulic motor 350, which motor may be of the reversible vane type, after passing through a speed control valve 356, such as one of the needle type and manually adjustable to control the flow of oil therethrough. At the same time, there is a parallel flow of oil through a revert cushioning oil pipe 358 and a cushioning valve 360, and then through a further revert cushioning oil pipe 362 to the revert oil pipe 354, which parallel flow is not through the speed control valve 365.

The valve 360 has a valve plunger 364 therein which carries a roller 366 for travel in a spiral cam groove 370 of a cam 368 on the shaft 349 of the hydraulic motor 350. The valve plunger 364 is so designed with respect to the porting in the valve 360 that adjacent the ends of the revert and invert oscillations of the gear 340 the oil flow is choked so as to cushion the ends of the strokes in addition to the elliptical gears 346 and 348 starting and ending the oscillations slowly and speeding up the motion intermediate the ends.

Invert oil pipes 372 and 374 are also shown with a speed control valve 376 for the invert stroke and there are likewise invert cushioning oil pipes 378 and 380 to the pipe 374 with the cushioning valve 360 interposed between them.

*Revert-invert assembly associated with housing 114*

Figures 16, 20:
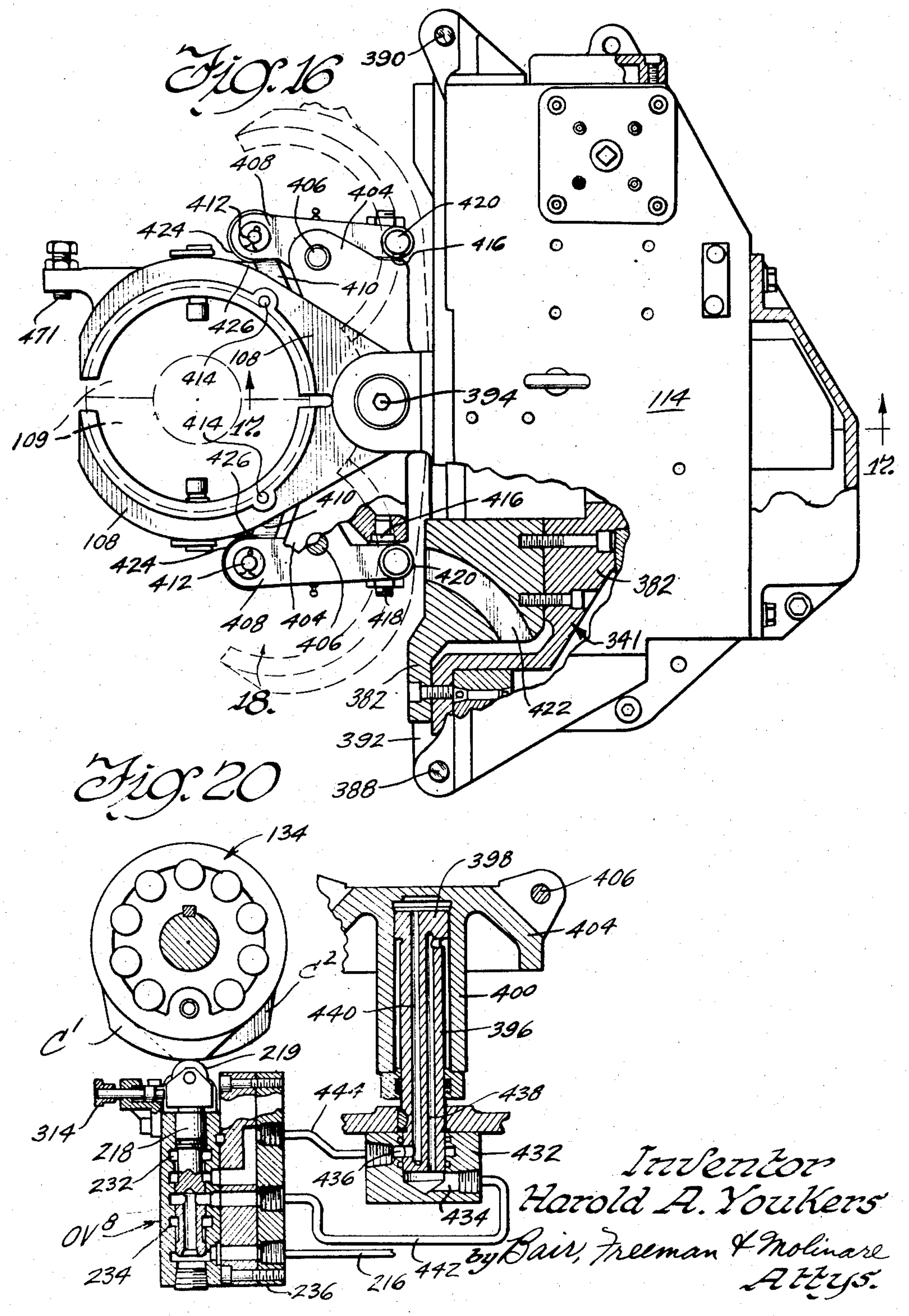
Fig. 16 is an enlarged plan view, partly in section, of a portion of Fig. 1 and shows particularly a revert-invert mechanism for a parison mold.
Fig. 20 is a diagrammatic view showing the oil circuit for the parison mold opening and closing mechanism of Figs. 16, 17 and 18.
Figures 17, 18:
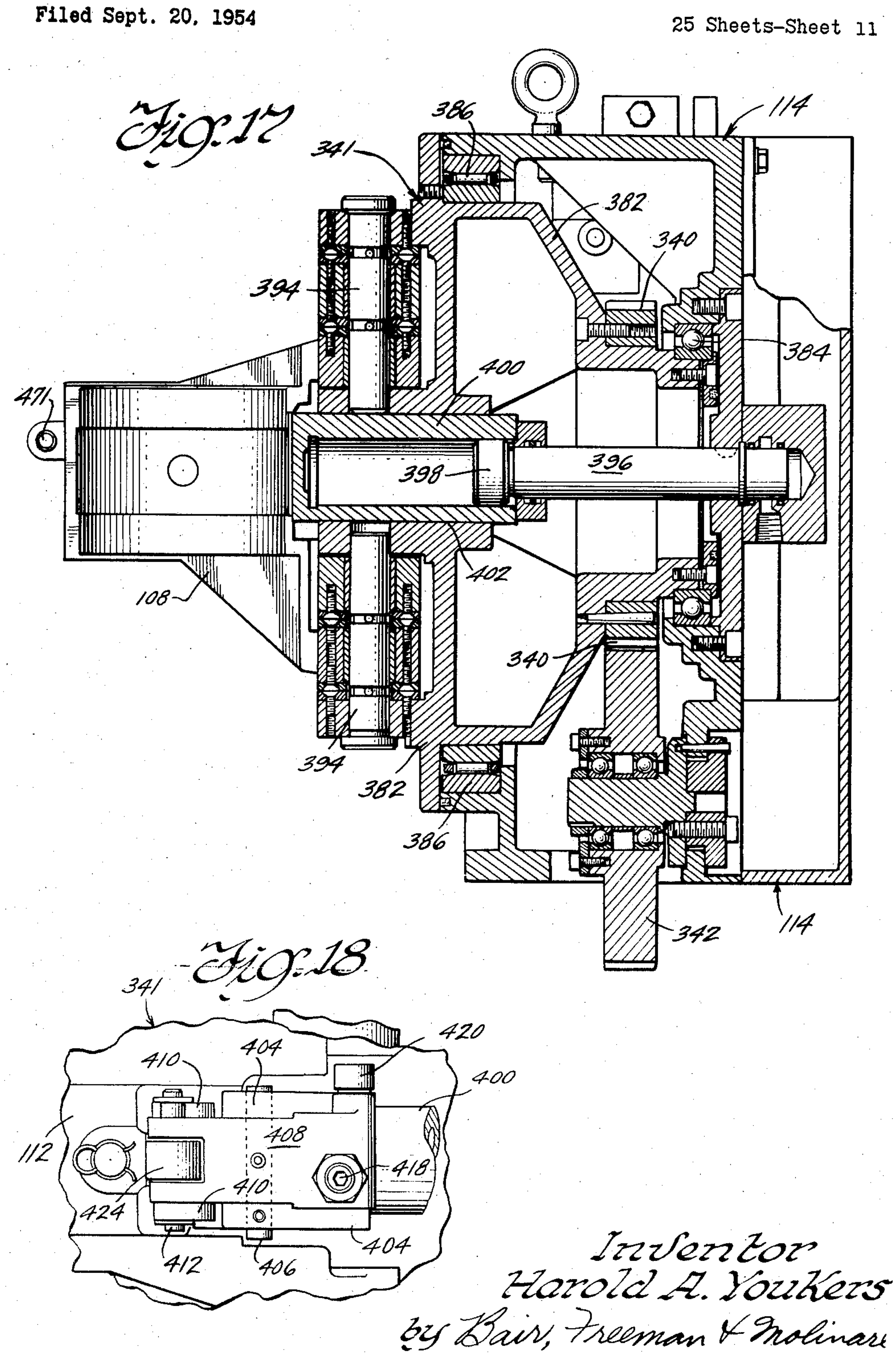
Fig. 17 is a vertical sectional view, thereof, on the line 17—17 of Fig. 16.
Fig. 18 is a partial side view of Fig. 16 showing particularly a parison mold holder opening and closing link.

Referring to Fig. 16, 17 and 18 for details of the revert-invert assembly 341, the gear 340 is secured to a cage 382 that is oscillatable in ball bearings 384 and roller bearings 386 carried by the revert-invert mechanism housing 114. To limit the oscillations of the cage 382 the housing 114 is provided with a revert stop 388 and an invert stop 390, and the cage is provided with a stop lug 392 oscillatable between the stops 388 and 390. The stops are preferably hardened to minimize wear.

*Parison mold holder operating means*

The parison mold holders 108 are pivoted at 394 on the cage 382 and are locked in the closed position shown solid or swung to the open position shown dotted in Fig. 16 by the following described mechanism. A piston rod 396 has its inner end anchored to the housing 114 as shown in Fig. 17 and has a piston 398 on its outer end over which a cylinder 400 is slidably mounted. This cylinder is slidable in a rectangular passageway 402 of the cage 382 and is provided with a T-head 404 on its outer end (see also Fig. 20).

The T-head 404 carries a pair of pivots 406 to which the intermediate portions of levers 408 are pivoted and these levers are connected by lniks 410 to the parison mold holders 108, the pivots being shown at 412. The T-head 404 carries wear pads 416 for stop screws 418 and adjacent these stop screws there are rollers 420 on the levers 408. A cam groove 422 is provided in the cage 382 to receive each of the rollers 420 during the opening of the parison mold as will hereinafter be described.

Figure 19:
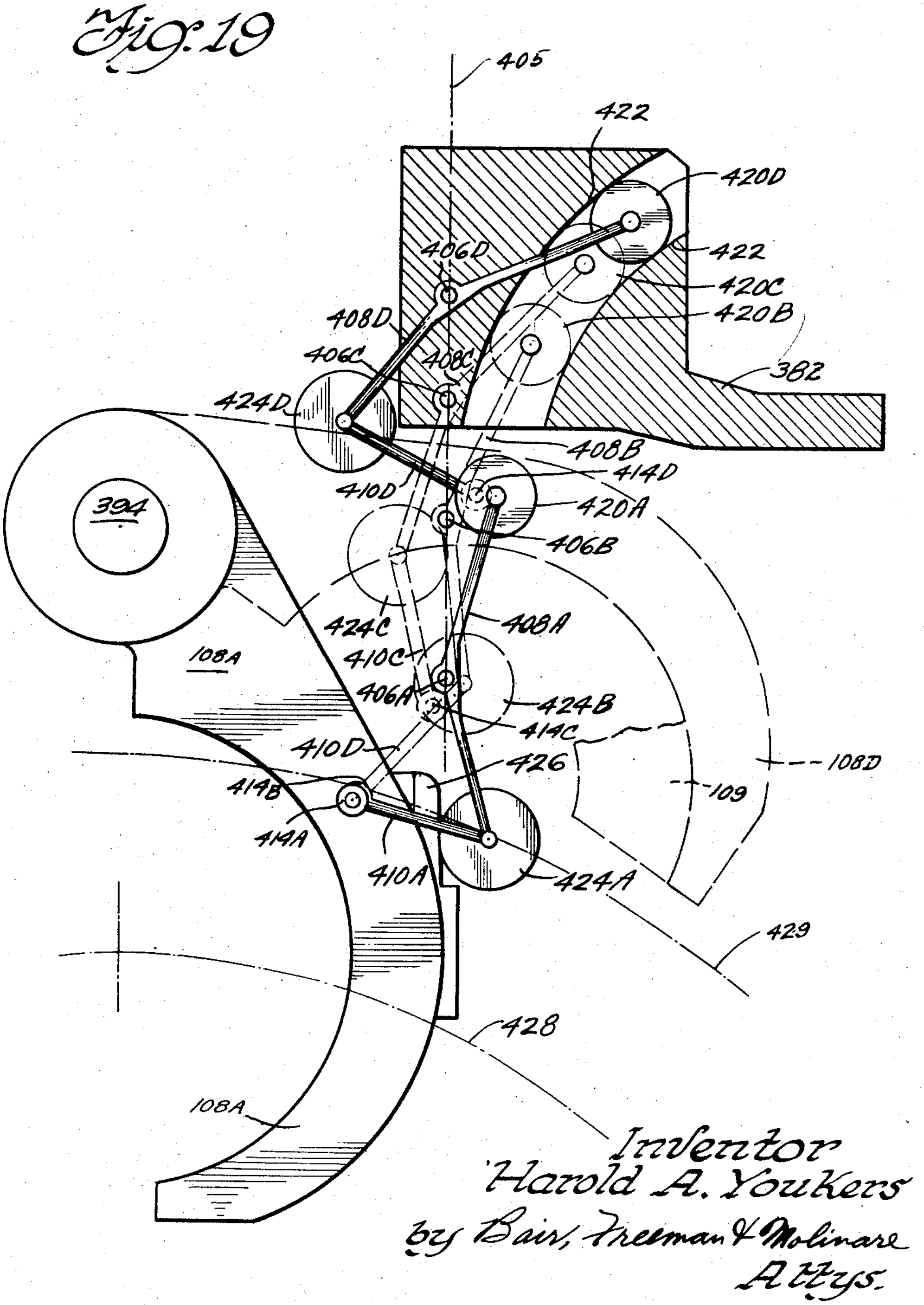
Fig. 19 is a diagrammatic view of elements of Fig 16 showing the parison mold holder opening and closing action afforded by the mechanism disclosed in Figs. 16, 17 and 18.

The opposite ends of the levers 408 are provided with rollers 424 adapted to coact with cam pads 426 on the parison mold holders 112 to cooperate in this operation. In Fig. 19 I show diagrammatically the operation of the levers 408 in such manner that the mold holders 108 are opened to a relatively wide-open position so that the parison will clear the mold during transfer which is on a center line (arc 428), the indicated arc (dash line 429) being the outside of the parison when of maximum size capable of being formed in my machine. The parts 108, 406, 408, 410, 420 and 424 are shown in four different positions indicated as 108A, 108B, 108C, 108D, 406A . . . 424D (except part 108, two positions).

The A position is with the mold holders 108 closed and the D position with them wide open. In the A position the forward movement of the cylinder 400 and the T-head 404 causes the rollers 424 to ride on the cam pads 427 and exert substantially great leverage to hold the mold holders closed with the stop screws 418 riding the wear pads 416 and the rollers 424 climbing the cam pads 426 instead of depending on the links 410 for this holding action.

In the D position the rollers 420 have been swung outwardly due to the curvature of the cam grooves 422 which in conjunction with the pivots 406 moving straight inwardly (up in Fig. 19 as indicated by the dot and dash line 405) causes the pivots 412 to swing in toward the vertical center plane of the cage 382, thus swinging the links 410 to a considerable angle and in the reverse direction relative to position A as shown in Fig. 19, thus accomplishing the desired maximum degree of opening at 108A illustrated by dash lines.

*Operation of parison mold holders 108*

Referring to Fig. 20, an oil valve $OV^8$ is shown for controlling the reciprocations of the cylinder 400 relative to the piston 398. A connection fitting 432 encloses the inner end of the piston rod 396 and has cavities 434 and 436 therein communicating with passageways 438 and 440 in the piston rod. The passageway 440 is for delivering oil beyond its end. In the position shown in Fig. 20, the valve $OV^8$ is delivering oil through a mold opening oil pipe 442 to the cavity 434 for propelling the cylinder 400 inwardly relative to the piston 398 and the cylinder is shown at its inner limit of movement (opposite that shown in Fig. 17). In this position the parison mold holders 112 are open as shown dotted in Fig. 16.

When the valve $OV^8$ is in its opposite position the oil is delivered through a mold closing oil pipe 444 to the cavity 436 for extending the cylinder 400 relative to the piston 398 as in Fig. 17. A latch 314 is provided for the oil valve $OV^8$ to prevent the parison mold holders from closing during equipment changes or when substituting another parison mold for one that has been in use.

*Details of turret head 116*

Figure 22:
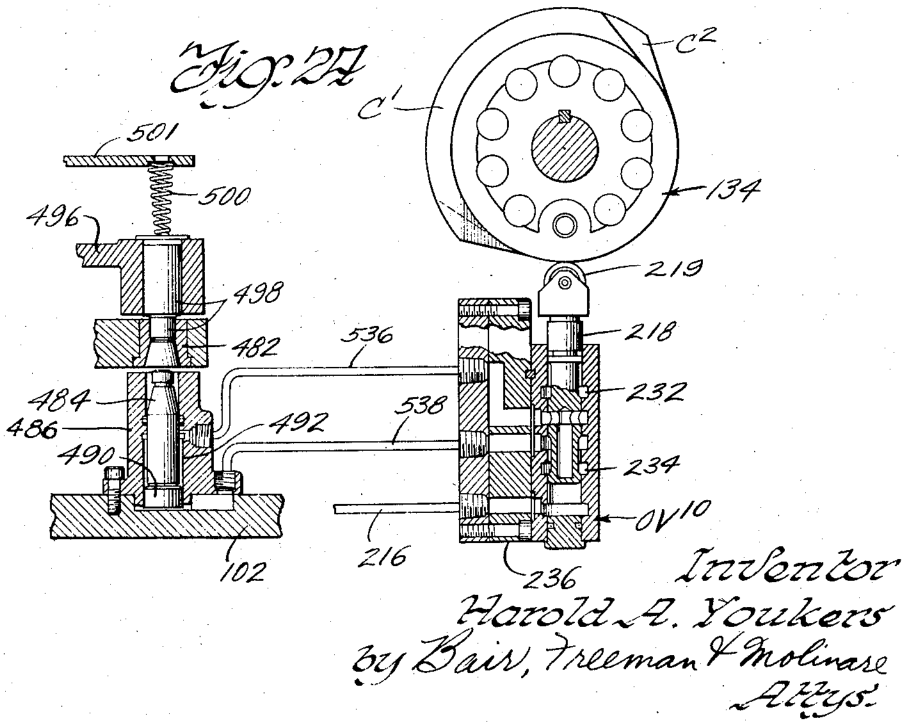
Fig. 22 is a vertical sectional view on the line 22—22 of Fig. 21.

The turret head 116 is secured to the upper end of a center column 446 journaled in bearings 448 and 450 as shown in Fig. 22. The bearing 448 is located on the bottom of the mechanism case 102 and the bearing 450 is mounted on the cover plate 104.

The turret head 116 carries three stub shafts 452 on each of which is a bearing 454. A bracket 456 is mounted on each bearing by means of a slotted arm 458 extending from the bracket and slidable along the side of the bearing, being clamped thereto by a pair of clamp screws 460. This arrangement permits vertical adjustment for height of the finish ring relative to the machine and also vertical adjustment of the plunger 162. Each bracket 456 is provided with a cross-shaft 462, the outside of which is grooved longitudinally. Slidably mounted on each end thereof is a cap 464 which is broached to fit the grooves of the cross-shaft 462 to prevent rotation of the caps relative to the cross-shaft 462. The two caps are connected together by a spring 466 that normally holds the caps inwardly as at stations (1) and (2) in Fig. 21 whereas at station (3) they are shown spread apart which is caused by a cam 654, as will hereinafter appear.

Figure 21:
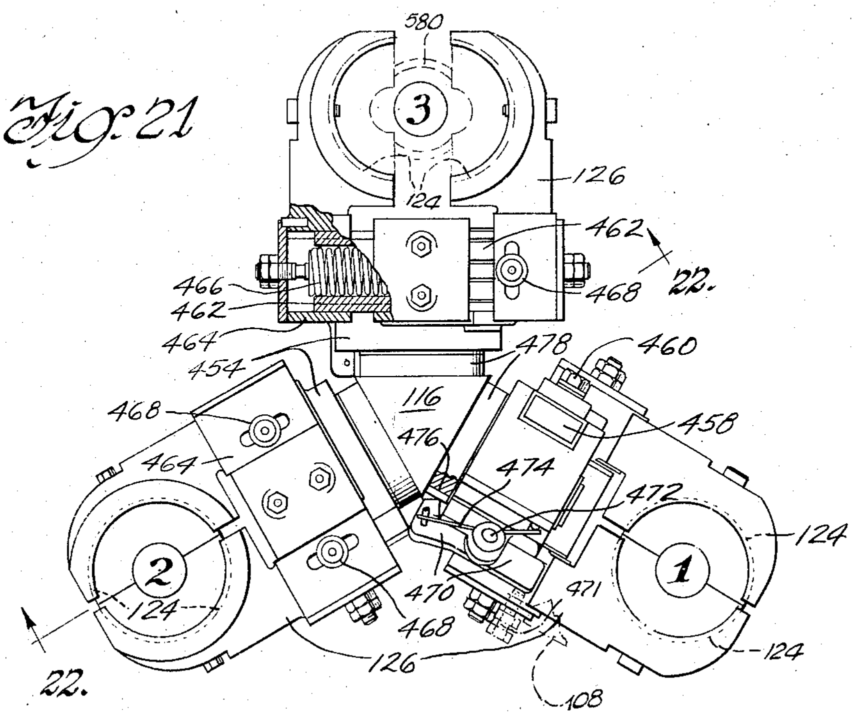
Fig. 21 is an enlarged plan view of the central portion of Fig. 1 and shows particularly a turret mechanism.

Referring to Fig. 21, a finish ring turn-over latch 470 is disclosed pivoted at 472 and normally biased by means of a spring 474 toward clockwise rotation so that the left hand end thereof enters a notch 476 in the flange 478 that secures the stub shaft 452 to the turret head 116.

Referring again to Fig. 22, an indexing disc 480 is pinned to the center column 446 just above the lower bearing 448. This disc is provided with three index bushings 482 spaced 120° apart and corresponding to the three stations (1), (2) and (3). A register pin 484 is slidably mounted in a boss 486 secured to the bottom of the mechanism case 102 and is normally in the elevated position shown. The register pin is provided with a piston 490 in a cylinder bore 492 of the boss 486 and is actuated by oil, as will hereinafter be described.

An index gear sector 494 is rotatable on the center column 446, a pair of bearings 488 being provided for this purpose. The gear sector has an arm 496 in which is slidably mounted an index pin 498. The index pin is normally in a lowered position under the action of a spring 500 backed by an arm 501. The register pin 484 thrusts the index pin 498 out of the bushing 482 when it travels upward, and the lower pin end of 498 then slides on the disc 480 to the next bushing 482 where the spring 500 causes it to enter for next movement of the disc with the gear sector 494 and its arm 496.

Figures 22, 23:
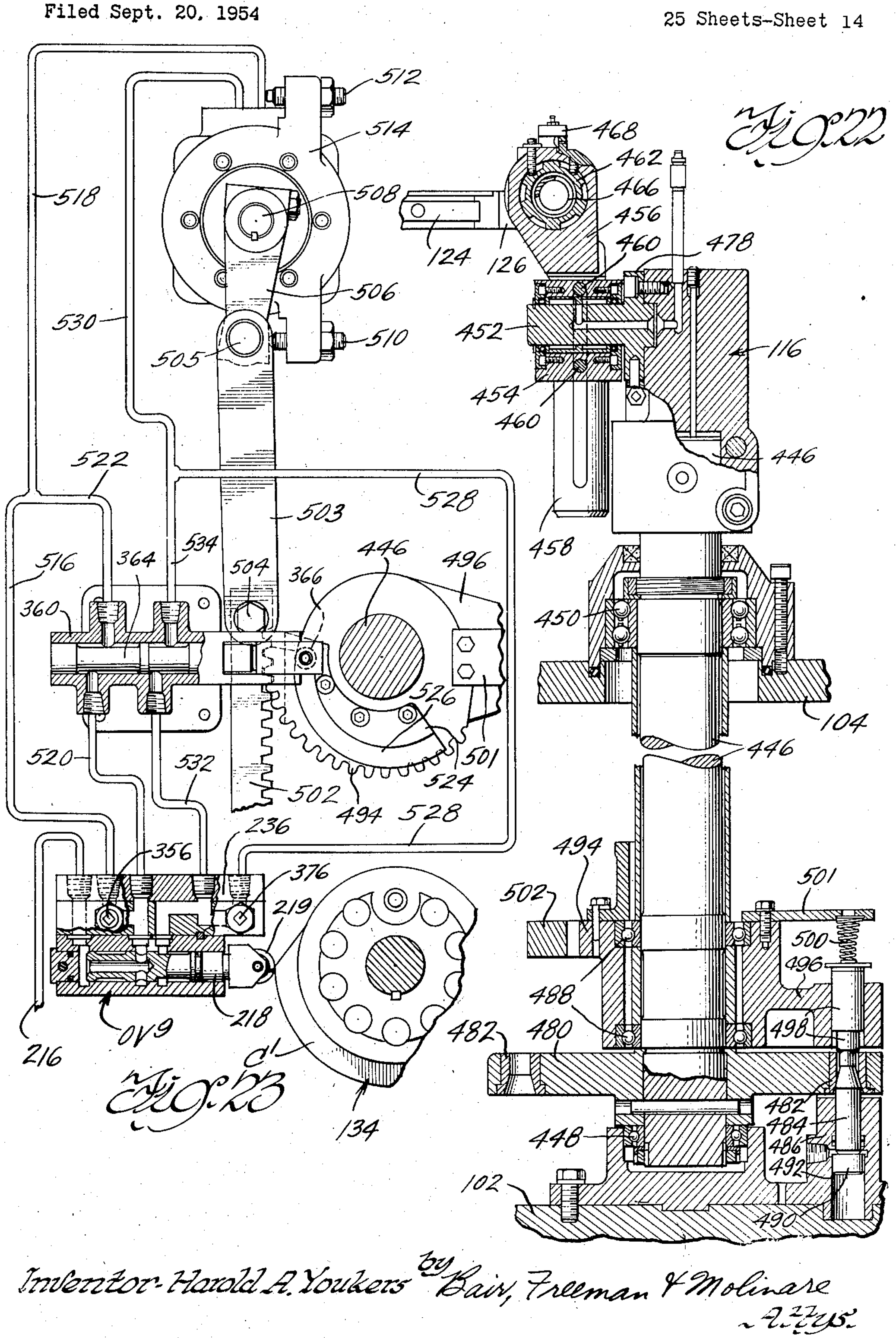
Fig. 23 is a diagrammatic view showing the indexing mechanism for the turret and the oil circuit therefor together with its controlling elements.
Figures 25, 26:
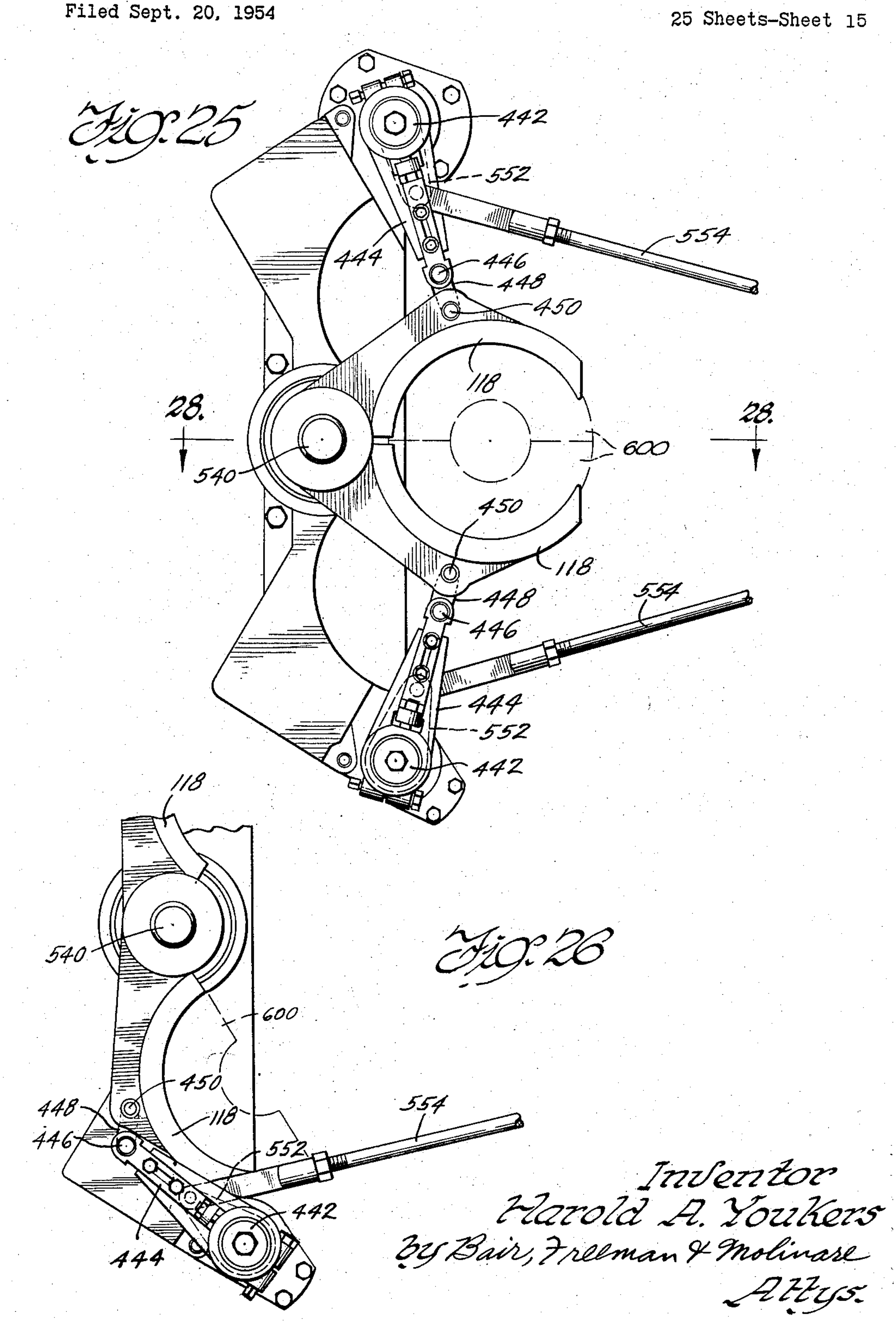
Fig. 25 is an enlarged plan view of a portion of Fig. 1 showing a blow mold opening and closing linkage with the mold holders in the closed position.
Fig. 26 is a similar view showing the mold holders in the open position.

For oscillating the index gear sector 494 I provide a rack 502 meshing therewith and slidably mounted (see Figs. 4 and 23). A link 503 is pivoted to the rack at 504 and is also pivoted at 505 to an arm 506 on a shaft 508 of a hydraulic motor 514. A pair of stops 510 and 512 are provided to limit the oscillations of the arm 506 and thereby the oscillations of the index gear sector 494.

*Transfer operation of turret head 116*

Referring to Fig. 23, an oil valve $OV^9$ is provided operated by one of the timers 134 and in the position shown supplies oil under pressure from the oil supply line 216 through transfer return oil pipes 516 and 518 to one side of the hydraulic motor 514. The supply is through a speed control valve 356, the same as described in connection with the oil valve $OV^7$. At the same time, a parallel oil supply is provided through transfer return cushioning oil pipes 520 and 522 to the pipe 518 through a cushioning valve 360 similar to the one already described in connection with the oil valve $OV^7$. The cushioning operation is likewise similar. The valve 360 for the transfer operation now being described has a plunger 364 and a roller 366, and the roller is cooperable with a spiral slot 526 in a cam 524 on the indexing gear sector 494.

In the other position of the valve $OV^9$, oil is supplied to transfer indexing oil pipes 528 and 530 through a speed control valve 376. Also, there is a parallel oil circuit through transfer indexing cushioning oil pipes 532 and 534 between which the cushioning valve 360 is interposed and a pipe 530 to the other side of the motor 514.

Referring to Fig. 24, an oil valve $OV^{10}$ is shown operated by one of the timers 134 and having a register pin down oil pipe 536 and a register pin up oil pipe 538. The pipes 536 and 538 extend to the boss 486 so that the pipe 536 enters the cylinder bore 492 above the piston 490 therein, whereas the oil from 538 enters the bore below the piston. In the position of the valve $OV^{10}$ as shown the register pin 484 is in the lowered position and in this position permits the index pin 498 to enter the adjacent index bushing 482 under the action of the spring 500.

*Operation of blow mold holders 118*

Referring to Figs. 1, 4, 25, 26, and 27, the blow mold holders 118 are pivoted on a pivot post 540 extending upwardly from the mechanism case cover 104. A pair of vertical rock shafts 442 extend through the cover plate 104 and above the cover plate are provided with arms 444 to which links 448 are pivoted at 446. The links 448 are also pivoted at 450 to the blow mold holders 118.

Within the mechanism case 102 arms 552 are mounted on the vertical rock shafts 442 and are connected by links 554 to a cross-head 556 to which they are pivoted at 558. The cross-head 556 is carried by a piston rod 560 extending into a cylinder 564, a piston 562 being provided on the piston rod within the cylinder.

Figure 27:
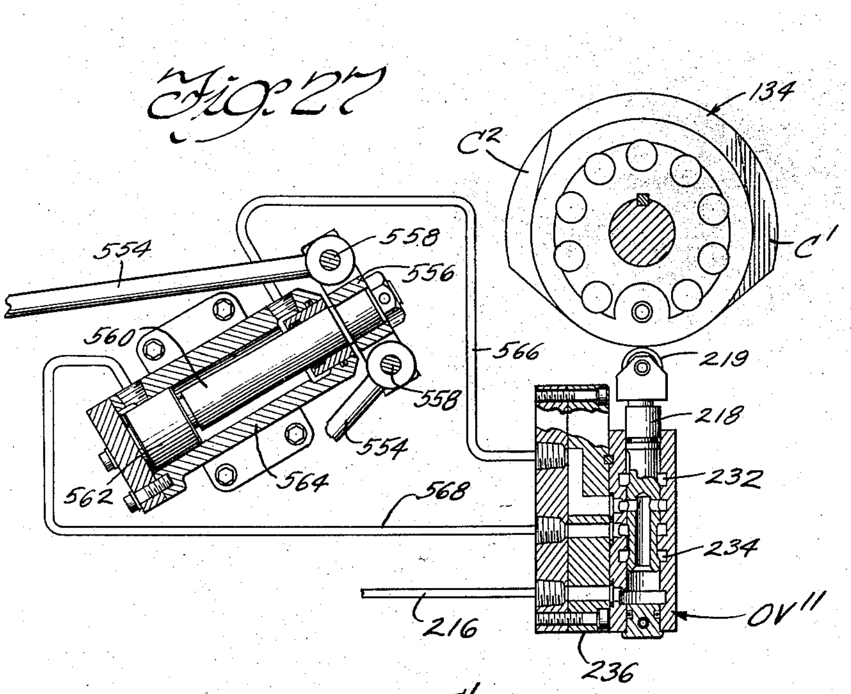
Fig. 27 is a diagrammatic view showing the hydraulic actuating mechanism for the blow mold linkage.

Referring to Fig. 27, particularly, I will now describe the operation of the blow mold holders. An oil valve $OV^{11}$ is operated by one of the timers 134 and in the position shown supplies oil under pressure from the line 216 to a mold opening oil pipe 566 extending to the outer end of the cylinder 564 for forcing the piston 562 inwardly. In the opposite position of the valve oil flows through a pipe 568 to the inner end of the cylinder for forcing the piston 562 outwardly.

Figure 29:
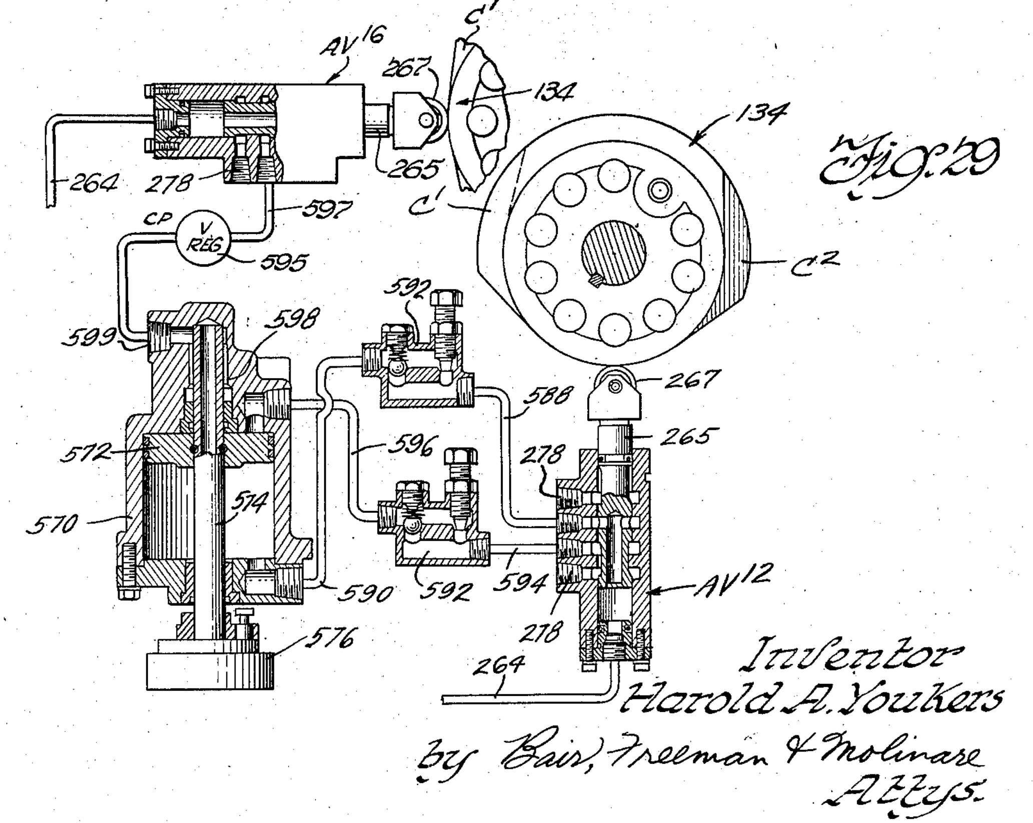
Fig. 29 is a diagrammatic view showing the hydraulic diagram for the mechanism disclosed in Fig. 28.
Figure 28:
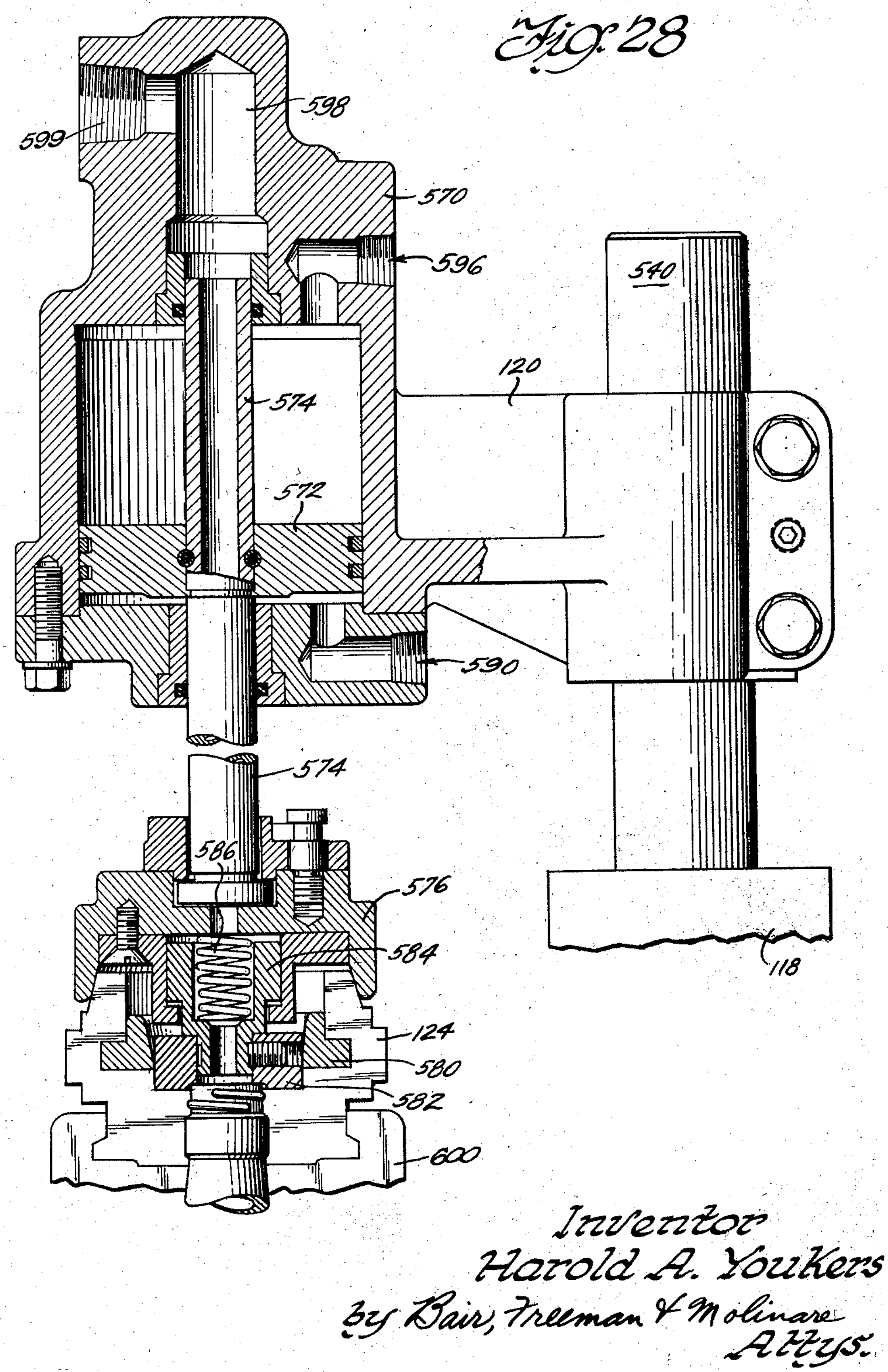
Fig. 28 is a vertical sectional view on the line 28—28 of Fig. 25 showing a blow head for the blow mold and its operating mechanism.

Referring to Figs. 1, 28 and 29 the blow head supporting arm 120 is clamped to the pivot post 540 above the blow mold holder arms 118 and has a cylinder 570 thereon in which is a piston 572 on a piston rod 574. A blow head 576 is supported on the lower end of the piston rod and is adapted to coact with the finish ring 124.

The finish ring 124 has a guide ring 580 therein for a plug 582 carried by a plunger 584 that is biased by a spring 586 to permit seating of the lower surface of the plug 582 against the finish ring 124 and at the same time seating of the blow head 576 on the finish ring to provide a locking of finish ring during final blow operation.

*Operation of blow head supporting arm 120*

Referring to Fig. 29, an air valve $AV^{12}$ is shown which in the position illustrated permits main air from the supply pipe 264 to pass through blow head up pipes 588 and 590 to the cylinder 570 below the piston 572 therein for raising it and thereby the blow head 576 to the position shown. A combined check and speed control valve 592 is interposed between the pipes 588 and 590 for quick inflow of air and slow return thereof.

In the reverse position of the valve $AV^{12}$ the air is supplied through blow head down pipes 594 and 596 to the cylinder 570 above the piston 572 therein for lowering the blow head to the position shown in Fig. 28. A second combined check and speed control valve is interposed between the pipes 594 and 596 for quick inflow and slow return of air during the down and up motions respectively of the piston 572.

The piston rod 574 is hollow and communicates with a cavity 598 in the top of the cylinder 570 to which blow air for finish blowing the ware is introduced by suitable mechanism. It will be noted that the blow head 576 has a central perforation and so does the plunger 584 to permit passage of the blowing air into the ware for blowing it to the final shape in the blow mold 600.

The blowing air just referred to is controlled by an air valve $AV^{16}$ to which air under pressure is supplied by the air line 264 and from which air flows through a final blow air pipe 597. A pressure regulator is interposed in the pipe 597 so that the pressure of the final blow air may be controlled to suit the ware being formed in the machine.

*Bottom plate 122*

Details of the bottom plate 122 and its support and operation are shown in Figs. 30 to 33. I provide a bottom plate support 602 having a retractable spring pressed retainer pin 604 to interchangeably retain various sizes and shapes of bottom plates 122 in the bottom plate support. The pin 604 terminates in a knob 605. A pair of rods 606 is pivoted at 608 to the bottom plate support 602 and extend downwardly therefrom. These rods have heads 610 normally coacting with shoulders 612 of the bottom plate support 602.

A link 614 is pivoted at 616 to the bottom plate support 602 and has a pivot pin 618 connecting it with the upper end of a rod 620 which is slidable in a housing 624. A spring 622 on the rod 620 normally tends to pull the assembly downwardly. The rods 606 are also slidable in the housing 624 and this housing is secured to the bottom of a plate 626 mounted in the cover plate 104 of the mechanism housing 102. The lower ends of the rods 606 are provided with a cross-head 628 upwardly from which a piston rod 630 extends and terminates in a piston 632. The piston 632 operates in a cylinder bore 634 of the housing 624 and is normally supplied with oil under the piston which elevates the bottom plate assembly to the solid line positions shown in Figs. 31 and 32.

*Operation of bottom plate 122*

Figures 33, 34, 35:
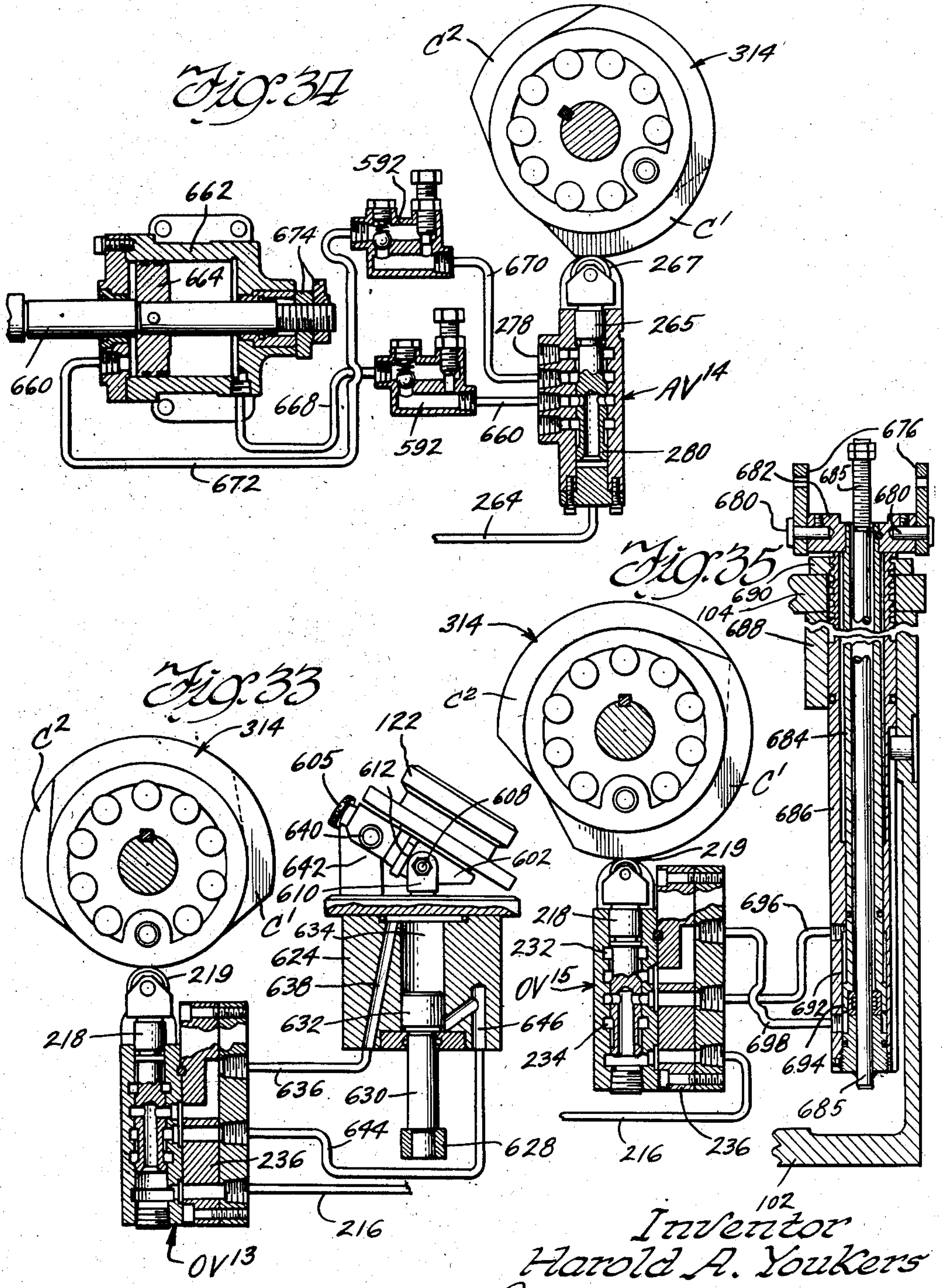
Fig. 33 is a hydraulic circuit diagram of the mechanism for operating the bottom plate.
Fig. 34 is a hydraulic circuit diagram for a cam operating mechanism to open the finish ring at a conveyor station.
Fig. 35 is a hydraulic circuit diagram for an elevating mechanism for the conveyor.

Referring to Fig. 33, an oil valve $OV^{13}$ is shown which in the position illustrated permits main oil from the line 216 to flow through a bottom plate down pipe 636 and a passageway 638 in the housing 624 to the bore 634 above the piston 632. This depresses the piston and thereby moves the bottom plate straight downwardly until a roller 640 carried by the bottom plate support 602 engages a cam 642, the shoulder 612 being held in contact with the head 610 by the spring 622 and the link 614 until the roller engages the cam, and thereafter further downward movement of the pivot 608 tips the bottom plate support 602 and the bottom plate 122 as shown in Fig. 33 for clearing it of any ware that may have been broken in the blow mold.

Figures 30, 31, 32:
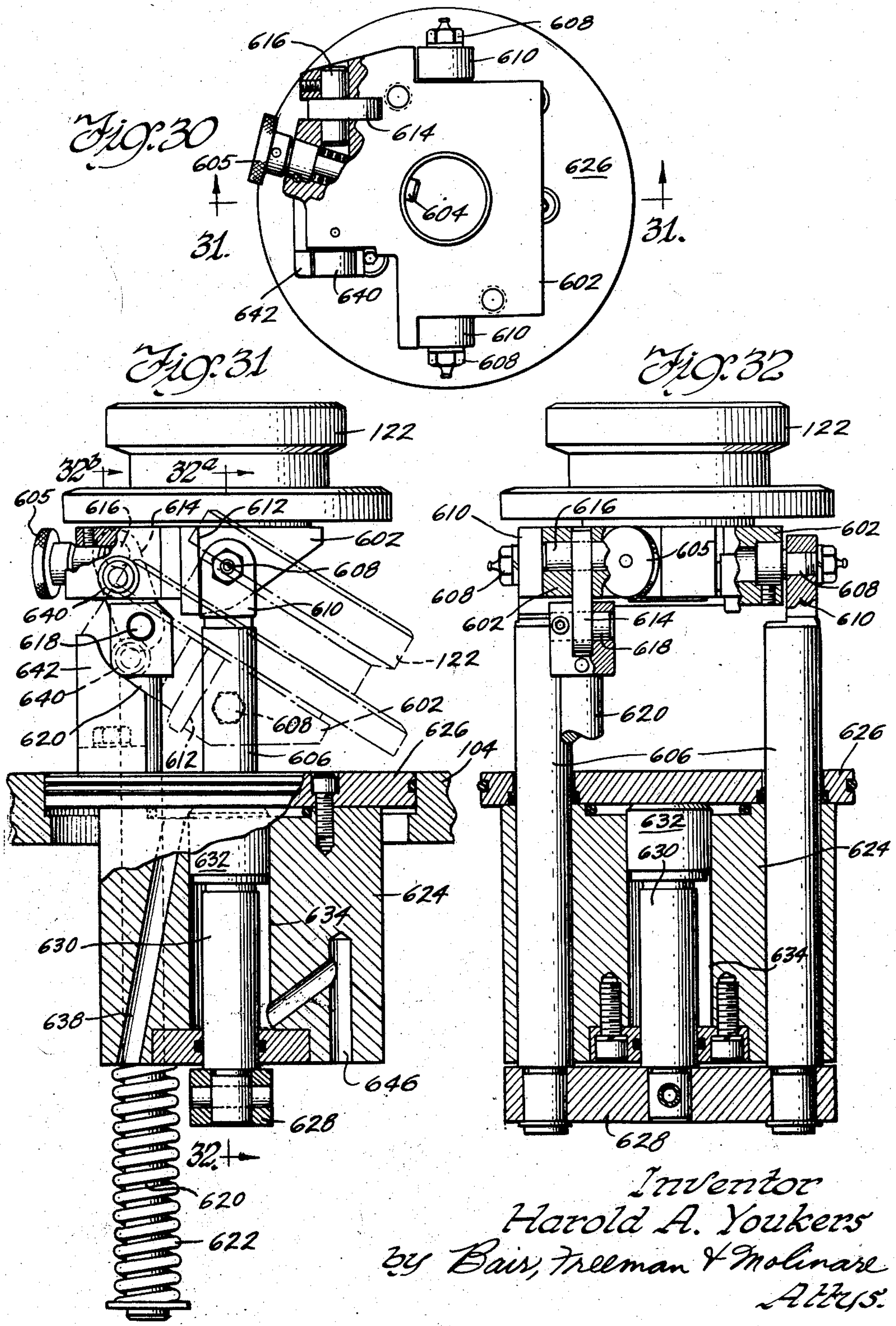
Fig. 30 is an enlarged plan view of a bottom plate as indicated by the arrow 30 on Fig. 2 adjacent the center bottom thereof, parts being broken away and other parts being shown in section to illustrate details.
Fig. 31 is a vertical sectional view of Fig. 30 to illustrate the operating mechanism for the bottom plate.
Fig. 32 is a vertical sectional view partially on the line **32—32*a* of Fig. 31, partially on the line 32—32*b*** thereof and partially in elevation.

When the valve $OV^{13}$ is actuated to its other position by the timer 134 with which it is associated oil flows through a bottom plate up pipe 644 and a passageway 646 to the cylinder bore 634 under the piston 632 for elevating the parts to the initial position shown in Figs. 31 and 32.

Referring to Fig. 1, a stationary bracket 648 adjacent the upper timer 134 and located above it carries a vertical rock shaft 650 from which an arm 652 extends carrying a wedge 654 adapted to coact with a roller 468 of each finish ring holder arm 126 to spread them apart and thus release the ware at station (3) so that the ware can drop on to the conveyor 128. This wedge is shown in the ware releasing position.

For actuating the wedge 654 I provide a second arm 656 secured to the rock shaft 650 and connected by a link 658 to a piston rod 660 extending into a cylinder 662. The rod and cylinder are also shown in Fig. 34. A piston 664 on the piston rod 660 within the cylinder 662 is illustrated as having been actuated by air under pressure from the supply line 264 through an air valve $AV^{14}$ and a pair of wedge-in oil pipes 660 and 668 between which I interpose one of the combination check and speed control valves 592 of Fig. 29. When the air valve $AV^{14}$ is in the opposite position air is introduced through wedge-out oil pipes 670 and 672 in which is interposed another of the valves 592. The valve $AV^{14}$ of course is operated by one set of the cams on one of the timers 134.

OPERATION OF CONVEYOR 128

In Fig. 1 the conveyor 128 has side frames 676 which are pivoted at 678 at one end of the conveyor so that the other end can be elevated and lowered for adjusting and operating purposes. The left ends of these side frames 676 are shown in section in Fig. 35 and are provided with pivot pins 680 located in a head 682 of a sleeve 684. The sleeve 684 is slidable in a threaded sleeve 686 which in turn is slidable in a boss 688 depending from the cover plate 104 and an adjusting nut 690 is threaded on the sleeve 686 and contacts the top of the cover plate for adjusting the height of the conveyor to different sizes of bottles.

Once each cycle of operation of the machine, the conveyor is lifted to minimize drop of the ware on the conveyor as it is released from the finish ring that is opened at station (3) by the wedge 654. This is accomplished by providing a cylinder bore 692 in the outer sleeve 686 for a piston head 694 on the lower end of the inner sleeve 684. An oil valve $OV^{15}$ in the position shown supplies oil from the oil supply pipe 216 through a conveyor down oil pipe 696 to the cylinder bore 692 above the piston head 694 therein. In the opposite position of the valve the oil is supplied through a conveyor up oil pipe 698 to the cylinder bore 692 below the piston head 694, all of course under the operation of one set of cams $C^1$ and $C^2$ on one of the timers 134.

HYDRAULIC SYSTEM

Figure 36:
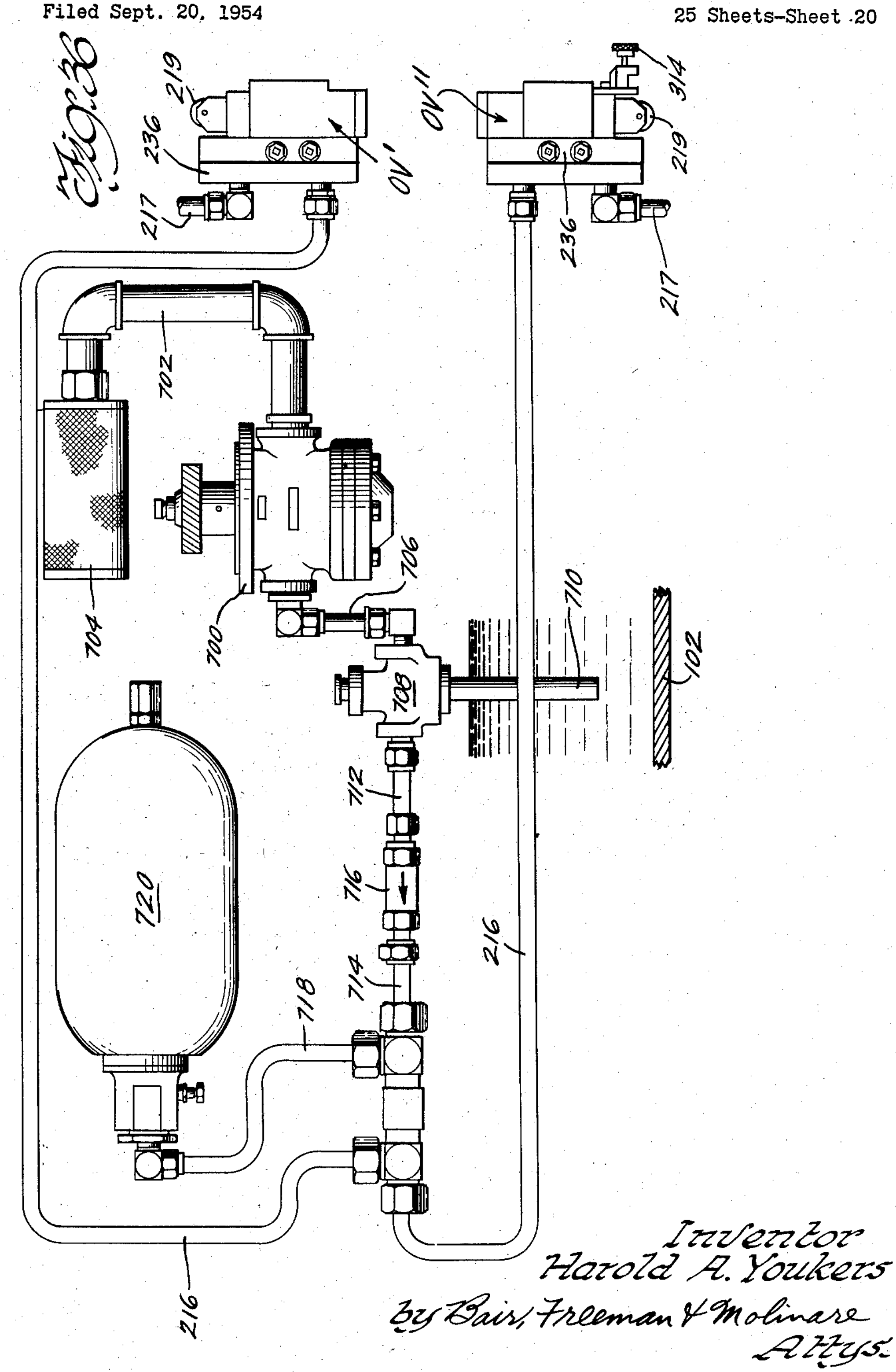
Fig. 36 is a hydraulic circuit diagram for the supply of oil under pressure to manifolds that convey the oil to oil valves that control the various mechanisms of my glassware forming machine.

In the mechanism case 102 I provide a hydraulic system shown in Fig. 36 for supplying oil under pressure to the manifolds 236 through the pipes 216 already referred to. The hydraulic system consists of a hydraulic pump 700 driven by the motor 130 and having an intake pipe 702 terminating in a filter 704 located in the oil that is carried in the mechanism case 102 at a level about one-third full. The filter 704 of course is submerged in this oil and the oil serves to lubricate all the parts that operate within the case 102.

Oil under pressure from the pump 700 flows through a pipe 706 and a pressure regulating by-pass or pressure control valve 708 to discharge pipes 712 and 714 having a check valve 716 interposed therebetween. The excess oil after the desired pressure has been built up in the valve 708 is by-passed through a pipe 710 to the case 102 below the level of the oil therein. The pipe 714 connects to an accumulator pipe 718 extending into an accumulator 720 wherein oil is received under the pressure of an air head therein so as to smooth out the pressure fluctuations resulting from demands for oil on the pump 700 by the various oil operated mechanisms under control of the oil valves already referred to. By way of illustration the oil valves $OV^1$ and $OV^{11}$ are shown with the oil supply pipes 216 extending from the oil discharge pipe 714 to their manifolds 236, return pipes 217 being provided to discharge the return oil back into the mechanism case 102.

Figs. 37 to 48 show details of one of the timers 134, the timers being similar in character and involving novel constructional features especially with respect to full 360° adjustment of the cams thereof so that any desired operation can be commenced and ended as desired during a cycle of operations. For each timer 134 there is a vertical timer shaft 722 having a spiral gear 724 on the lower end thereof (Figs. 38 and 46) driven by a mechanism which will later be described in synchronism with the glass feeder for a plurality of my glassware forming machines being fed therefrom. Each pair of cams $C^1$ and $C^2$ is rotatable on a cam carrier 726 in the form of a shouldered disc. These discs are stacked on the timer shaft 722 and keyed thereto for simultaneous rotation therewith by keys 728.

The cam $C^1$ is adjusted by the following described mechanism. As shown in Fig. 39 the cam is provided with internal gear teeth meshing with a pinion 730. The pinion 730 is keyed to a sleeve 732 that extends upwardly as shown in Fig. 41 and has a pinion 734 keyed to its upper end and meshing with another pinion 736. The pinion 736 is pinned to a stud 738 and an adjusting stem 740 is in turn pinned to the stud and extends upwardly therefrom. The stud 738 is provided with a pair of spring fingers 742 having serrated lower ends (see Fig. 45) which are biased outwardly to normally engage in serrations 744 of a top plate 745 for the timer. The stud 738 has a cross pin 746 with which an adjusting tool may be engaged. The top plate 745 and a pair of head plates 747 and 749 are keyed to the shaft 722 and a screw 751 and washer 753 retain them and the cams $C^1$ and $C^2$ closely stacked. Cap screws 755 and spacers 757 near the peripheries of the plates provide a housing like assembly for the gears 734 and 736.

Referring to Fig. 40, the cam $C^2$ is also provided with internal gear teeth and these mesh with a pinion 748 on a shaft 750. As shown in Fig. 41 the shaft 750 terminates in an adjusting stem 752 similar to the stem 740 having a pair of spring fingers 754 thereon with serrated lower ends normally engaged in serrations 756 in the top plate 745. The adjusting stem 752 also has a cross-pin 758.

An adjusting tool in the form of a knob 760 having a bore 762 to fit over the stems 740 and 752 and their springs 742 and 754 is provided for adjusting any one of the cams of either of the timers 134 by associating the tool therewith as shown for the stem 752 in Fig. 41. In this position the bore 762 contracts the springs 754 out of engagement with the serrations 756 so that the shaft 750 can be rotated as desired by the knob 760, a slot 764 cooperating with the pin 758 for this purpose. To show the adjustment, degree scales 766 are secured in grooves 768 adjacent the lower edges of the cam carriers 726 as shown in Fig. 41 by screws 770. The arrangement is such that the cams can be adjusted while the timer is rotating and after adjustment withdrawal of the knob 760 will permit the springs 754 to reenter the serrations 756 to retain the adjustment.

It will be noted that there are adjusting stems 740 for each of the cams $C^1$ and adjusting stems 752 for each of the cams $C^2$. Adjustment of all the cams is possible by extending the sleeves 732 and the shafts 750 through as many cam carriers 726 as necessary to reach the cams involved. The sleeves and shafts are progressively longer around the timer to reach the successive sets of cams, for instance, from the top set at the right side of Figs. 38 and 41 to the sixth set at the left side of Fig. 38.

Suitable rollers 772 and 774 (Fig. 37) on stationary brackets oppose the rollers 219 of the oil valves and air valves to properly support the stack of cams at the upper end of the timer shafts 722 while the lower ends of the shafts are journaled in a housing 780 (Fig. 38).

Referring to Fig. 46, the spiral gears 724 are driven by spiral gears 776 on a drive shaft 778 in a housing 780 secured to the case 102. The drive shaft 778 terminates in a driven disc 782 which as shown in Fig. 47 has a notch 784 therein.

A feeder shaft 786 is provided with a pinion 788 meshing with a gear 790. Where a number of my unit machines are fed from one furnace, all of the units would be driven from this shaft. Where the furnace feeds three of my units for instance, there would be a gear ratio 3:1 between the pinion 788 and the gear 790 as shown. The gear 790 carries a pair of ears 792 in which are mounted a pivot pin 794. A clutch arm 796 is pivoted thereon and is normally disengaged by a spring 798 that is disengaged with respect to the notch 784, a roller 800 being provided on the clutch arm 796 to engage in the notch during operation of the timers. A pair of side thrust rollers 802 are provided for the clutch arm 796 to afford smooth operation thereof without binding.

Referring to Fig. 47, I show at 806 a piston which is normally in the position illustrated by reason of a piston return spring 804. The piston is located in a cylinder bore 808 to which air may be supplied by an air line 810 extending from a timer control valve 812 located at any suitable point on the machine. This is an ordinary 3-way valve, the air supply being at 264 and exhaust to atmosphere at 814. Obviously, when the valve 812 is rotated clock-wise one-fourth turn air will be supplied to the cylinder bore 808 behind the piston 806 therein and against the action of the spring 804 will cause the piston to move a clutch arm pin 805 carried by the piston toward the left for swinging the clutch arm 796 to a position with the roller 800 engaging the face of the driven disc 782 until such time as the roller 800 registers with the notch 784. It will then drop into the notch for driving the timers in timed relation to the feeder shaft 786.

GLASSWARE FORMING OPERATIONS

Referring to the operations diagram in Fig. 49, one cycle of operations represented by one rotation of the timers 134 is diagrammed, the rotation being from 0° to 360° at which the first and second charges respectively of glass are delivered to the funnel 308. Under "Operation" the operations are named and under "Op. No." they are numbered. The stations (1), (2) and (3) at which the operations occur are indicated in circles under "Sta.," the station (T) at operations 9 and 10 indicating the turret 116 which is common to stations (1), (2) and (3). A thin base line is indicated for each operation and there two heavier lines are superposed on the base line, one being of medium thickness and the other considerably thicker. For instance, operation No. 1 "Plunger" (162) shows a thick line between 345° and 360° labeled "Up" and between 15° and 30° another thick one labeled "Down." Between 0° and the "Down" line, a medium thickness line is shown indicating that the plunger remains up due to its up operation just before 360° until the down operation after 15°.

The ports of the plunger 162 open when the plunger is about halfway up, so the gob of glass comes down as the plunger moves up, thus preventing the plunger having to press into the gob. This upward movement of the plunger causes a skin to form around it and when the plunger goes down the neck of the ware is reheated.

In order to facilitate consideration of the glassware forming operations, a chart follows with reference numerals and figure numbers where each operation may be found as to constructional details and hydraulic or compressed air circuits.

| Op. No. | Operation | Ref. No. | Figures |
|---|---|---|---|
| 1 | Plunger | 162 | 5, 8, 9 and 10. |
| 2 | Sleeve | 168 | 5, 8, 9 and 10. |
| 3 | Vacuum | 182 | 5, 6, 7, and 10. |
| 4 | Counterblow | 204 | 5 and 11. |
| 5 | Funnel | 308 | 1, 1A, 12 and 13. |
| 6 | Baffle | 113 | 1, 2, 5 and 14. |
| 7 | Revert-Invert | 341 | 1, 2, 4, 16 and 17. |
| 8 | Parison Mold | 109 | 5, 10, 16, 17, 18, 19 and 20. |
| 9 | Transfer | 116 | 21, 22, 23 and 24. |
| 10 | Register Pin | 484 | 22 and 24. |
| 11 | Blow Mold | 600 | 25, 26, 27 and 28. |
| 12 | Blow Head | 576 | 28 and 29. |
| 12a | Blowing Air Duration | ---- | 28 and 29. |
| 13 | Bottom Plate | 122 | 30, 31, 32 and 33. |
| 14 | Finish Ring | 124 | 21 and 34. |
| 15 | Conveyor | 128 | 1 and 35. |

Likewise, the "Sleeve" (168) of operation No. 2 moves up between 345° and 360°, remains up until past 180° and then moves down before reaching 195°. These settings, of course, are arbitrary and, as illustrated in Fig. 49, represent the settings for blowing quart bottles which may be formed at the rate of about 7½ pieces per minute in the glassware forming machine disclosed. For smaller and larger bottles the timing can be changed both as to the position of operation of the plunger and sleeve in respect to the charge at 0° and 360° and as to speed of the timer, which of course may be increased along with the feeder speed where smaller bottles are being blown or decreased where larger ones are being blown. For instance, one dram bottles can be formed at about 20 pieces per minute while gallon bottles can be formed in the same machine at about the rate of 5 pieces per minute.

It will be noted that "Vacuum" of operation No. 3 comes on just after the sleeve goes up and is turned off just before "Counterblow" of operation No. 4 is started. "Controlled" counterblow occurs between 30° and 75° while "Normal" counterblow then remains in effect until after 165° and until "Release" of counterblow is completed just before 180°. Controlled counterblow is the result of the operation of air valve $AV^{4a}$ shown in Fig. 11, whereas normal counterblow is the result of air supplied by air valve $AV^4$, also in Fig. 11.

In conventional counterblow machines it is necessary to provide a plunger greater in length than that for optimum finish-forming and neck-forming characteristics to assure that the weight of the fluid glass will not cause the preheated glass envelope formed by the plunger to retract through the sleeve before counterblow air can be introduced. I provide a new method with which counterblow air pressure can be built up at any rate desired by regulation of the needle valve 285 and the pressure regulator valve 287 shown in Fig. 11. The results are better finishes, clarity of ware, freedom from settle waves in the shoulder of the ware, reduced severity of settle wave and reduced thickness of glass in the neck, and therefore ability to make good lightweight ware. My method attains better finishes through reduced tendency for skin of glass envelope to stretch the inner edge of the finish down, thus resulting in dropped finishes experienced in machines which turn the parison over before counterblow and on which the glass envelope would stretch considerably before counterblow could be applied. The result is very little vertical wave in the shoulders of bottles, although inversion before counterblow introduces a great many other faults into the operation. My machine attains the advantages of the aforementioned operation with a counterblow process that doesn't incur the disadvantages. Settle wave severity is usually based on the proportion of time taken to form finish to the total time of glass in the parison mold. Under my method the glass will not lie in the parison mold with a sharp demarcation line between filled and unfilled portions for any considerable period, but rather will begin moving glass upwardly in the parison mold cavity much earlier so that less settle wave will be apparent in the finished ware.

More perfect distribution of glass in the finished ware may be attained if the necks are cleaned out by earlier counterblow and the thickness of the glass in the neck will be determined to some extent by the depth of skin formation on the outside of the parison. This depth will be proportionate to the time, if the parison mold is at the correct temperature, and therefore it follows that more glass will be moved out of the neck if counterblow can be made to move the glass gently and earlier without causing lumpiness in the neck. Lumpiness generally is caused by too much plunger length and contact time, while moving the glass from the neck of the bottle will provide a greater quantity for making the heel and bottom of the bottle, and should, therefore, permit better bottles at lighter weight.

The "Funnel" of operation No. 5 comes in about 30° before the charge is dropped and moves out about 15° after it is dropped whereupon the "Baffle" (113) of operation No. 6 swings in and down right after the "Funnel" moves out and stays down until after 180°. Counterblow, of course, starts after the baffle 113 swings in and down and stops before the baffle moves up and swings out.

The sleeve 168 moves down after counterblow when the parison mold is ready to be reverted. The spring 172 shown in Fig. 10 seals the sleeve 168 to the guide ring 580 and must be heavy enough to prevent bounce when the heaviest gob of glass hits the sleeve. This is especially true where large areas are involved. The plunger and the sleeve have a vacuum match separate from the ring and sleeve match during the beginning or "controlled" portion of the counterblow while the air is expanding the plunger bubble.

Operation No. 7 "Revert-Invert" occurs between 195° and 345° with actual reversion taking place for about 30° at the beginning of this period and inversion taking place during about 30° at the end thereof, the intermediate period of time from 225° to 315° being the time during which the parison mold is in the reverted position and during which time the "Parison Mold" of operation No. 8 opens, remains open and closes. Revert occurs after counterblow and after the baffle moves up, and after reversion the parison is ready to be transferred to the blow mold.

At station (1) the finish ring holders 126 are in the inverted position (see Figs. 1 and 21) which occurs after transfer of the turret head 116 is effected and also after the parison mold has been closed. In order of time the transfer stroke for the turret head occurs first and then the parison mold closes, whereupon a latch release element 471 carried by the outer end of one of the parison mold holders 108 (see Figs. 16 and 17) engages the righthand end of the latch 470 in Fig. 21 to remove its lefthand end from the notch 476, so that the bearing 454 can be rotated on the stub shaft 452. Fig. 1 also shows this coaction between 470 and 471, whereas in Fig. 2 element 471 has been shown dotted. Next inversion takes place, and the finish ring holders 126 remain in the inverted position during the parison blowing operation at station (1), during the finish blowing operation at station (2) and during release of the ware at station (3). By this time a second parison has been blown at station (1) and a third one is soon to be blown with reversion occurring just before the parison mold opens and after which the transfer stroke takes place.

Opening of the parison mold removes the release element 471 from the latch 470 so that the spring 474 will move the latch back into the notch 476 to keep the finish ring against undesirable rotation on the stub shaft 452 until the next revert-invert operation.

Referring again to "Transfer" of operation No. 9 rotation or the transfer stroke of the turret 116 is preceded by the lowering of the "Register Pin" of operation No. 10 as shown in Fig. 24 at 484, so that the motor 514 of Fig. 23 can be energized for swinging the arm 506 clockwise and thereby rotating the turret shaft 446 clockwise, the rotation being indicated in operation No. 9 as "Transfer Stroke." After this transfer stroke is completed the register pin moves up as shown under operation No. 10, and the "Return Stroke" of the transfer may then occur any time after invert and before revert, such as from about 90° to 135° as illustrated under operation No. 9.

At station (2) the "Blow Mold" (600) of operation No. 11 closes after the transfer stroke and remains closed until before the next transfer stroke while the "Blowhead" (576) of operation No. 12 moves down after the blow mold closes and up just before it opens. The finish-blow air may then enter the blow head any time after it is down and before it is up and this is represented by about 240° of rotation of the timer indicated as "Blowing Air Duration" of operation No. 12*a*.

The "Bottom Plate" (122) of operation No. 13, of course, must be up before the blow mold closes and, as represented in the diagram, it starts up about the same time the blow mold starts to close but is completely up before the blow mold does close. Similarly, the blow mold starts to open before the bottom plate is moved down and it starts to move down before the blow mold is completely open so as to minimize the down position. The appropriate cams $C^1$ and $C^2$ of the timers 134 may be adjusted for the desired degree of overlap and the speed controls and cushioning valves of the various control valves may be adjusted for the desired operation to suit the ware being formed.

After the ware is transferred from station (2) to station (3), it may be cooled by appropriate blasts of air from cooling nozzles (not shown) as indicated by the dotted line "Bottle Cooling" in operation No. 14 and may remain in effect until the "Finish Ring" opens beginning at about 165°. The finish ring 124 remains open until about 240° (just before the transfer stroke takes place).

At station (3) the conveyor (128) of operation No. 15 rises just before the finish ring opens and lowers just after it has opened so as to receive the bottle and then drop it far enough that the bottle can clear the finish ring as it closes and transfers to station (1) again. The conveyor is driven by a hydraulic motor 816 shown in Fig. 4 through bevel gears 818 and a vertical shaft 820 terminating in a bevel gear housing 822 (see Fig. 1) having therein a suitable geared connection from the vertical shaft to the conveyor.

The timers 134 are so constructed as to make possible the camming of all operations with full adjustment throughout the entire 360° both as to position and duration, the two cams $C^1$ and $C^2$ for any one oil or air valve being selected of suitable duration which of course will vary in the different operations as disclosed throughout the various views of the drawings where the sets of cams $C^1$ and $C^2$ appear. My arrangement is such that pilot valves or so called "spool" or "trip" valves are eliminated.

By means of the internal gearing, sleeves and shafts disclosed in the figures mentioned, adjustment from the top of the timer down to any set of cams is made possible while the timer is in operation. The locking fingers 742 and 754 coacting with the serrations 744 and 756, which serrations are relatively fine, coupled with the step down gearing arrangement from the pinions 730 and 749 to the cams $C^1$ and $C^2$ provides for relatively small increments of change in adjustment for nicely balancing the timing of any valve for the particular operation that it controls. The knob 76 may be conveniently associated with any of the adjusting stems 740 or 752 and will automatically unlock the fingers after which the desired cam can be rotated to the desired position and when the knob is removed the fingers again lock the cam in that position. Thus even though all the cams are in a stack of considerable height adjustment for each is available at the top of the timer.

The hydraulic system for supplying oil under pressure to the various mechanisms to operate them is shown in Fig. 36. Details of the timers 134 and the means for driving them from the feeder shaft 786 are shown in Figs. 37 to 48 and the timing chart for one class of ware for these timers is shown in Fig. 49.

The operation of my machine I believe is fully described in the foregoing specification. Some changes may be made in the construction and arrangement of parts of my glassware forming machine and my method of forming glassware may be modified within certain limits without departing from the real spirit and purpose of my invention, and it is my intention to cover by my claims any modified forms of structure, use of mechanical equivalents or modifications of the disclosed method which may be reasonably included within their scope.

I claim as my invention:

1. In a glassware forming machine of the character disclosed, a turret rotatably mounted, three finish rings continuously carried by said turret and rotatable thereon to upper and lower positions, means for intermittently rotating said turret to bring said finish rings successively to a plurality of stations, a single parison mold at a first one of said stations and coacting with each said finish rings successively when in their lower positions for receiving a charge of glass, means at said first station for counterblowing the parison, a single blow mold at a second one of said stations, means at said second station and coacting with said finish rings successively when in their upper positions for blowing the parison to final shape in said blow mold, and means for opening said finish rings successively at a third one of said stations, each of said three finish rings being simultaneously carried to said first, second and third stations in succession and opened at said third station.

2. In a glassware forming machine of the character disclosed, a turret rotatably mounted, three finish ring holders continuously carried by said turret and rotatable thereon to upper and lower positions, a finish ring carried by each of said finish ring holders, means for intermittently rotating said turret to bring each of said finish rings successively to a plurality of three stations, a single parison mold at a first one of said stations for coacting with said finish rings successively when in their lower positions to receive a charge of glass, means at said first station for counterblowing the parison, a single blow mold at a second one of said stations for coacting with said finish rings successively when in their upper positions, means at said second station for blowing the parison to final shape, and means at a third one of said stations for opening said finish ring holders and the finish rings carried thereby successively to release the finished ware.

3. In a glassware forming machine of the character disclosed, a turret rotatably mounted, three finish rings continuously carried by said turret and mounted for reversion and inversion, means for intermittently rotating said turret to bring each of said finish rings successively to a plurality of stations, a parison mold at a first one of said stations for receiving a charge of glass, revert-invert mechanism at said first station, openable and closable parison mold holders carried by said revert-invert mechanism, said parison mold being carried by said parison mold holders and coacting with said finish rings in succession, means at said first station to counterblow the parison, a blow mold at a second one of said stations and coacting with said finish rings in succession, said finish rings in succession suspending the blown ware over a conveyor at a third one of said stations, and means for opening said finish rings in succession at said third station, each of said three finish rings being simultaneously carried to said first, second and third stations in succession and opened at said third station.

4. In a glassware forming machine of the character disclosed, a turret rotatably mounted, three finish rings continuously carried by said turret, means for intermittently rotating said turret to bring each of said finish rings successively to a plurality of stations, a single parison mold at a first one of said stations for receiving a charge of glass, a single blow mold at a second one of said stations and coacting with said finish rings successively, openable and closable blow mold holders at said second station, said single blow mold being carried by said blow mold holders and coacting with said finish ring while at said second station, means at said second station to finish blow the ware in said blow mold, said finish rings successively suspending the blown ware over a conveyor at a third one of said stations, and means for successively opening said finish rings at said third station, each of said three finish rings being simultaneously carried to said first, second and third stations in succession, coacting with said single parison mold at said first station, coacting with said single blow mold at said second station and being opened at said third station.

5. In a glassware forming machine of the character disclosed, a turret rotatably mounted, three finish rings continuously carried by said turret, means for intermittently rotating said turret to bring a first one of said finish rings successively to a plurality of stations, a parison mold at a first one of said stations and coacting with said first finish ring while in inverted position for receiving a charge of glass, means at said first station for blowing the parison, a blow mold at a second one of said stations and coacting with said first finish ring while in reverted position, means at said second station for final blowing of the ware, said first finish ring successively suspending the blown ware over a conveyor at a third one of said stations, and means for opening said first finish ring at said third station for deposit of the ware on said conveyor, the second and third of said finish rings being simultaneously carried similarly to said first finish ring to said first, second and third stations in succession, said parison mold coacting with them in succession at said first station for receiving successive charges of glass and having successive parisons blown therein, being successively subjected to said means for final blowing the ware at said second station and being successively opened at said third station.

6. In a glassware forming machine of the character disclosed, a turret rotatably mounted, three finish rings continuously carried by said turret, means for intermittently rotating said turret to bring each of said finish rings successively to a plurality of stations, a parison mold at a first one of said stations for receiving a charge of glass, said parison mold coacting with said finish rings successively, means at said first station for blowing the parison, a blow mold at a second one of said stations, said blow mold coacting with said finish rings successively, means at said second station for final blowing the parison to final shape in said blow mold, said finish rings successively suspending the blown ware over a conveyor at a third one of said stations, and hydraulic means for opening said finish rings successively at said third station, each of said three finish rings being simultaneously carried to said first, second and third stations in succession and opened by said hydraulic means at said third station.

7. In a glassware forming machine of the character disclosed, a turret rotatably mounted, three finish rings continuously carried by said turret, means for intermittently rotating said turret to bring each of said finish rings successively to a plurality of stations, a parison mold at a first one of said stations and coacting with said first finish ring while in inverted position for receiving a charge of glass, said parison mold coacting with said finish rings successively, means at said first station for blowing the parison, a blow mold at a second one of said stations, said blow mold coacting with said finish rings successively while in reverted position, means at said second station for final blowing of the ware, said finish rings successively suspending the blown ware over a conveyor at a third one of said stations, and means for opening said finish rings successively at said third station, each of said three finish rings being simultaneously carried to said first, second and third stations in succession and opened at said third station.

8. In a glassware forming machine of the character disclosed, a turret rotatably mounted, three finish rings continuously carried by said turret and mounted for reversion and inversion, means for intermittently rotating said turret to bring each of said finish rings successively to a plurality of stations, a parison mold at a first one of said stations and coacting with said finish rings successively, means at said first station for inverting said finish rings successively and the parison mold coacting therewith to receive a charge of glass and for reverting said finish rings successively and the parison mold coacting therewith, means at said first station for blowing the parison after inverting and before reverting, a blow mold at a second one of said stations and coacting with said finish rings successively, means at said second station for final blowing of the ware, said finish rings successively suspending the blown ware over a conveyor at a third one of said stations, and means for opening said finish rings successively at said third station, said three finish rings being simultaneously carried to said first, second and third stations in succession and opened at said third station.

9. In a glassware forming machine of the character disclosed, a turret rotatably mounted, three finish ring holders continuously carried by said turret and mounted thereon for reversion and inversion, a finish ring carried by each of said finish ring holders, means for intermittently rotating said turret to bring each of said finish rings successively to a plurality of three stations, the first a parison blowing station, the second a finish blowing station, and the third a conveyor station, revert-invert mechanism at said first station, openable and closable parison mold holders carried by said revert-invert mechanism, a parison mold carried by said parison mold holders and coacting with said finish rings in succession for reverting and inverting them and said finish ring holders with said parison mold, means to counterblow the parison, a baffle plate at said first station, and mechanism for coacting the same with said parison mold during the counterblowing operation.

10. In a glassware forming machine, a turret rotatably mounted, three finish rings continuously carried by said turret and holders mounting said finish rings thereon for reversion and inversion, means for intermittently rotating said turret to bring said finish rings successively to a plurality of stations, a parison mold at a first one of said stations coacting with said finish rings for receiving a charge of glass-revert-invert mechanism at said first station, openable and closable parison mold holders carried by said revert-invert mechanism, said parison mold being carried by said parison mold holders and coacting with said finish rings in succession for reverting and inverting them and said finish ring holders with said parison mold, means at said first station to counterblow the parison, a blow mold at a second one of said stations, openable and closable blow mold holders at said second station, said blow mold being carried by said blow mold holders and coacting with said finish rings in succession, means at said second station to finishblow the ware in said blow mold, and ring opening means at a third one of said stations to release the finished ware.

11. In a glassware forming machine, a turret rotatably mounted, three finish rings continuously carried by said turret, means for intermittently rotating said turret to bring said finish rings successively to a plurality of stations, a parison mold at a first one of said stations coacting with said finish rings successively for receiving a charge of glass, means at said first station for counterblowing the parison, said means including a plunger for the finish of the parison, a sleeve slidable on said plunger and engageable with said finish rings in succession, means for elevating said sleeve and a second means for elevating said plunger, means at a second one of said stations for blowing the parison to final shape in a blow mold coacting with said finish rings successively, and means for opening said finish rings successively at a third one of said stations for releasing the blown ware.

12. In a glassware forming machine, a turret rotatably mounted, three finish rings continuously carried by said turret, means for intermittently rotating said turret to bring each of said finish rings successively to a plurality of stations, a parison mold at a first one of said stations coacting with each of said finish rings successively for receiving a charge of glass, means at said first station for counterblowing the parison, said means including a plunger for the finish of the parison, a sleeve slidable on said plunger and engageable with said finish rings in succession, hydraulic means for elevating said sleeve and a second hydraulic means for elevating said plunger, said first hydraulic means including a spring to hold said sleeve in engagement with said finish rings, a blow mold at a second one of said stations, means for blowing the parisons to final shape in said blow mold while it is coacting with said finish rings in succession at said second station, said finish rings successively suspending the blown ware at a third one of said stations, and means for opening said finish rings in succession at said third station, all three of said finish rings being simultaneously carried to said first, second and third stations in succession and opened at said third station.

13. In a glassware forming machine, a turret rotatably mounted, three finish rings continuously carried by said turret and holders mounting said finish rings thereon for reversion and inversion, means for intermittently rotating said turret to bring said finish rings successively to a plurality of stations, a parison mold at a first one of said stations coacting with said finish rings successively for receiving a charge of glass, revert-invert mechanism at said first station, openable and closable parison mold holders carried by said revert-invert mechanism, a parison mold carried by said parison mold holders and coacting with said finish rings in succession for reverting and inverting them and said finish ring holders with said parison mold, means to counterblow the parison, a plunger at said first station to enter the neck of the parison, a sleeve at said first station for engaging said finish rings successively, said plunger being slidable relative to said sleeve, hydraulic means for elevating said plunger, a second hydraulic means for elevating said sleeve, a blow mold at a second one of said stations, means for blowing the parisons to final shape in said blow mold while coacting with said finish rings successively and means for opening said finish rings successively at a third one of said stations for releasing the blown ware.

14. In a glassware forming machine, a turret rotatably mounted, three finish rings continuously carried by said turret and holders mounting said finish rings thereon for reversion and inversion, means for intermittently rotating said turret to bring said finish rings successively to a plurality of stations, a parison mold at a first one of said stations coacting with said finish rings successively for receiving a charge of glass, revert-invert mechanism at said first station, openable and closable parison mold holders carried by said revert-invert mechanism, said parison mold being carried by said parison mold holders and coacting with said finish rings in succession for reverting and inverting them and said finish ring holders with said parison mold, means at said first station to counterblow the parison, a baffle plate at said first station and mechanism for coacting the same with said parison mold during the counterblowing operation, a plunger at said first station to enter the neck of the parison, a sleeve at said first station for engaging said finish rings successively, said plunger being slidable relative to said sleeve, hydraulic means for elevating said plunger, a second hydraulic means for elevating said sleeve, a blow mold at a second one of said stations, a finish blowing mechanism at said second station, openable and closable blow mold holders at said second station, said blow mold being carried by said blow mold holders and coacting with said finish rings in succession, and means at a third one of said stations for opening said finish rings in succession, all three of said finish rings being simultaneously carried to said first, second and third stations in succession and opened at said third station.

15. In a glassware forming machine, a turret rotatably mounted, three finish rings continuously carried by said turret and holders mounting said finish rings thereon for reversion and inversion, means for intermittently rotating said turret to bring said finish rings successively to a plurality of stations, a parison mold at a first one of said stations coacting with said finish rings successively for receiving a charge of glass, revert-invert mechanism at said first station, openable and closable parison mold holders carried by said revert-invert mechanism, said parison mold being carried by said parison mold holders and coacting with said finish rings in succession for reverting and inverting them and said finish ring holders with said parison mold, means at said first station to counterblow the parison, a plunger at said first station to enter the neck of the parison, a sleeve at said first station for engaging said finish rings successively, said plunger being slidable relative to said sleeve, means for elevating said plunger, a second means for elevating said sleeve, a blow mold at a second one of said stations, means for blowing the parisons to final shape in said blow mold while coacting with said finish rings successively, and means for opening said finish rings successively at a third one of said stations, all three of said finish rings being simultaneously carried to said first second and third stations in succession and opened at said third station.

16. In a glassware forming machine of the character disclosed, a turret rotatably mounted, three finish rings continuously carried by said turret and mounted thereon for reversion and inversion, means for intermittently rotating said turret to bring said finish rings successively to a plurality of stations, a single parison mold at a first one of said stations coacting with said finish rings successively for receiving a charge of glass, means at said first station for counterblowing the parison, means at said first station for inverting the parison mold on an axis substantially midway between the top and bottom of the parisons and for inverting said finish rings successively therewith to receive charges and reverting them after counterblowing the parison, a single blow mold at a second one of said stations and coacting with said finish rings successively, means at said second station for final blowing of the ware, and means for opening said finish rings successively at a third one of said stations for releasing the blown ware, said three finish rings being simultaneously carried to said first, second and third stations in succession and opened at said third station.

17. In a glassware forming machine, a turret rotatably mounted, three finish rings continuously carried by said turret, means for intermittently rotating said turret to bring said finish rings successively to a plurality of stations, a parison mold at a first one of said stations coacting with said finish rings successively for receiving a charge of glass, means for counterblowing the parison at said first station, said means including a plunger for the finish of the parison, a sleeve slidable on said plunger and engageable with said finish rings in succession, separate means for engaging said sleeve with said finish rings and for extending and retracting said plunger relative to said sleeve, a blow mold at a second one of said stations, means for blowing the parison to final shape in said blow mold while coacting with said finish rings successively at said second station, said finish rings successively suspending the blown ware over a conveyor at a third one of said stations, and means for opening said finish rings successively at said third station, all three of said finish rings being simultaneously carried to said first, second and third stations in succession and opened at said third station.

18. In a glassware forming machine of the character disclosed, a turret rotatably mounted, three finish rings continuously carried by said turret and mounted thereon for reversion and inversion, means for intermittently rotating said turret to bring said finish rings successively to a plurality of stations, a parison mold at a first one of said stations for receiving a charge of glass, revert-invert mechanism at said first station, openable and closable parison mold holders carried by said revert-invert mechanism, said parison mold being carried by said parison mold holders and coacting with said finish rings in succession for reverting and inverting them and said finish ring holders with said parison mold, means to counterblow the parison, a baffle plate at said first station and mechanism for coacting the same with said parison mold during the counterblowing operation, a blow mold at a second one of said station, means for blowing the parison to final shape therein, openable and closable blow mold holders at said second station, said blow mold being carried by said blow mold holders and coacting with said finish rings in succession, a blow head and a bottom plate at said second station and mechanism for coacting the same with said blow mold during the blowing operation, and means at a third one of said stations for opening said finish rings in succession to release the blown ware, all three of said finish rings being simultaneously carried to said first, second and third stations in succession and being in inverted position at said first station, in reverted position at said second station and opened at said third station.

19. In a glassware forming machine, a turret rotatably mounted, three finish rings continuously carried by said turret and holders mounting said finish rings thereon for reversion and inversion, means for intermittently rotating said turret to bring said finish rings successively to a plurality of stations, a parison mold at a first one of said stations for receiving a charge of glass, revert-invert mechanism at said first station, openable and closable parison mold holders carried by said revert-invert mechanism, said parison mold being carried by said parison mold holders and coacting with said finish rings in succession for reverting and inverting them and said finish ring holders with said parison mold, means to counterblow the parison, openable and closable blow mold holders at a second one of said stations, a blow mold carried by said blow mold holders and coacting with said finish rings in succession, means at said second station to finish blow the ware in said blow mold, and means at a third one of said stations for releasing the blown ware by opening said finish rings in succession at said third station, all three of said finish rings being simultaneously carried to said first, second and third stations in succession and opened at said third station.

20. A glassware forming machine comprising a turret rotatably mounted, three finish rings continuously carried by said turret and mounted thereon for reversion and inversion, means for intermittently rotating said turret to bring said finish rings successively to a plurality of stations, a single parison mold at a first one of said stations coacting with said finish rings successively for receiving a charge of glass, openable and closable parison mold holders, said single parison mold being carried by said parison mold holders and coacting with said finish rings in succession, means at said first station to counterblow the parison, a single blow mold at a second one of said stations, openable and closable blow mold holders at said second station, said blow mold being carried by said blow mold holders and coacting with said finish rings in succession, means to finish blow the ware in said blow mold, and means at a third one of said stations for releasing the blown ware by opening said finish rings in succession when at said third station.

21. In a glassware forming machine of the character disclosed, a turret rotatably mounted on a vertical axis, three finish ring holders continuously carried by said turret and rotatable thereon on horizontal axes to upper and lower positions, a finish ring carried by each of said finish ring holders, means for intermittently rotating said turret to bring each of said finish rings successively to a plurality of three stations, a single parison mold at a first one of said stations for coacting with said finish rings successively when in their lower positions to receive a charge of glass, means at said first station for successively counterblowing the parisons, each of said horizontal axes being substantially midway between the top and bottom of the parison counterblown at said first station, a single blow mold at a second one of said stations for coacting with said finish rings successively when in their upper positions, means at said second station for successively blowing the parisons to final shape, and means at a third one of said stations for opening said finish ring holders and the finish rings carried thereby successively to release the finished ware.

References Cited in the file of this patent

UNITED STATES PATENTS

| | | |
|---|---|---|
| 1,056,579 | Proeger | Mar. 18, 1913 |
| 1,670,821 | Pawling et al. | May 22, 1928 |
| 1,865,967 | Schoonenberg | July 5, 1932 |
| 1,878,863 | La France | Sept. 20, 1932 |
| 2,000,367 | Williamson et al. | May 7, 1935 |
| 2,212,699 | Pearson | Aug. 27, 1940 |
| 2,307,564 | Bridges | Jan. 5, 1943 |
| 2,334,653 | Senkbeil | Nov. 16, 1943 |
| 2,351,899 | Allen | June 20, 1944 |
| 2,357,501 | Carnahan | Sept. 5, 1944 |
| 2,368,472 | Jardine | Jan. 30, 1945 |
| 2,384,498 | Sloan | Sept. 11, 1945 |
| 2,438,088 | Wyss | Mar. 16, 1948 |
| 2,442,315 | Samuelson | May 25, 1948 |
| 2,500,083 | MacConnell | Mar. 7, 1950 |
| 2,592,705 | Jewell et al. | Apr. 15, 1952 |
| 2,640,298 | Winder | June 2, 1953 |